(12) United States Patent
Stolmeier et al.

(10) Patent No.: US 7,254,873 B2
(45) Date of Patent: Aug. 14, 2007

(54) SCORED TAMPER EVIDENT FASTENER TAPE

(75) Inventors: Robert C. Stolmeier, Shelbyville, IN (US); Paul F. Edelman, Greenwood, IN (US)

(73) Assignee: Illinois Tool Works, Inc., Glenview, IL (US)

( * ) Notice: Subject to any disclaimer, the term of this patent is extended or adjusted under 35 U.S.C. 154(b) by 409 days.

(21) Appl. No.: 10/228,236

(22) Filed: Aug. 26, 2002

(65) Prior Publication Data

US 2003/0002753 A1  Jan. 2, 2003

Related U.S. Application Data

(63) Continuation-in-part of application No. 09/866,457, filed on May 25, 2001, now abandoned, which is a continuation of application No. 09/090,851, filed on Jun. 4, 1998, now Pat. No. 6,257,763.

(60) Provisional application No. 60/314,787, filed on Aug. 24, 2001.

(51) Int. Cl.
*A44B 19/16* (2006.01)
(52) U.S. Cl. ........................................ 24/400
(58) Field of Classification Search ............... 383/61, 383/5, 63–65, 61.2, 61.3, 204, 210, 207, 383/208, 210.1; 24/30.5 R, 399, 400, 389, 24/585.12, DIG. 50; 53/133.4, 139.2
See application file for complete search history.

(56) References Cited

U.S. PATENT DOCUMENTS

| | | | |
|---|---|---|---|
| 2,978,769 A | 4/1961 | Harrah | |
| 2,994,469 A | 8/1961 | Troup et al. | |
| 3,052,399 A | 9/1962 | Brown | |
| 3,054,434 A | 9/1962 | Ausnit et al. | |
| 3,122,807 A | 3/1964 | Ausnit | |
| 3,172,443 A | 3/1965 | Ausnit | |
| 3,181,583 A | 5/1965 | Lingenfelter | |
| 3,202,559 A | 8/1965 | Laguerre | |
| 3,226,787 A | 1/1966 | Ausnit | |
| 3,462,068 A | 8/1969 | Suominen | |
| 3,780,781 A | 12/1973 | Uramoto | |
| 3,991,801 A | 11/1976 | Ausnit | |
| 4,196,030 A | 4/1980 | Ausnit | |
| 4,199,845 A | 4/1980 | Ausnit | |
| 4,262,395 A | 4/1981 | Kosky | |
| 4,285,376 A | 8/1981 | Ausnit | |
| 4,337,889 A | 7/1982 | Moertel | |

(Continued)

FOREIGN PATENT DOCUMENTS

EP  0 456 277 A2  11/1991

(Continued)

*Primary Examiner*—James R. Brittain
(74) *Attorney, Agent, or Firm*—John V. Daniluck; Bingham McHale LLP

(57) ABSTRACT

A reclosable fastener tape includes a first fastener strip and a second fastener strip that is adapted to mate with the first fastener strip in a reclosable fashion. A sheet connects the first fastener strip to the second fastener strip. The sheet has an unpunctured tear line formed between the first fastener strip and the second fastener strip for providing a tamper evident hermetic seal when the fastener tape is sealed with a bag.

15 Claims, 31 Drawing Sheets

U.S. PATENT DOCUMENTS

| | | |
|---|---|---|
| 4,637,063 A | 1/1987 | Sullivan et al. |
| 4,713,839 A | 12/1987 | Peppiatt |
| 4,874,257 A | 10/1989 | Inagaki |
| 4,890,935 A | 1/1990 | Ausnit |
| 4,923,309 A | 5/1990 | VanErden |
| 4,925,316 A | 5/1990 | Van Erden et al. |
| 4,927,271 A | 5/1990 | Branson |
| 4,945,714 A | 8/1990 | Bodolay et al. |
| 4,966,470 A | 10/1990 | Thompson et al. |
| 4,971,454 A | 11/1990 | Branson et al. |
| 4,976,811 A | 12/1990 | Siebert |
| 5,007,142 A | 4/1991 | Herrington |
| 5,007,143 A | 4/1991 | Herrington |
| 5,010,627 A | 4/1991 | Herrington et al. |
| 5,020,194 A | 6/1991 | Herrington et al. |
| 5,023,122 A | 6/1991 | Boeckmann et al. |
| 5,024,537 A | 6/1991 | Tilman |
| RE33,674 E | 8/1991 | Uramoto |
| 5,063,644 A | 11/1991 | Herrington et al. |
| 5,067,208 A | 11/1991 | Herrington, Jr. et al. |
| 5,070,583 A | 12/1991 | Herrington |
| 5,085,031 A | 2/1992 | McDonald |
| 5,088,971 A | 2/1992 | Herrington |
| 5,092,684 A | 3/1992 | Weeks |
| 5,103,546 A | 4/1992 | Rossini et al. |
| 5,121,997 A | 6/1992 | La Pierre et al. |
| 5,131,121 A | 7/1992 | Herrington, Jr. et al. |
| 5,140,796 A | 8/1992 | Pope |
| 5,152,613 A | 10/1992 | Herrington, Jr. |
| 5,158,499 A | 10/1992 | Guckenberger |
| 5,161,286 A | 11/1992 | Herrington, Jr. et al. |
| 5,167,608 A | 12/1992 | Steffens, Jr. et al. |
| 5,186,543 A | 2/1993 | Cochran |
| 5,189,764 A | 3/1993 | Herrington et al. |
| 5,205,649 A | 4/1993 | Fullerton |
| 5,211,482 A | 5/1993 | Tilman |
| 5,224,779 A | 7/1993 | Thompson et al. |
| 5,283,932 A | 2/1994 | Richardson et al. |
| RE34,554 E | 3/1994 | Ausnit |
| 5,293,671 A | 3/1994 | Oda |
| 5,301,394 A | 4/1994 | Richardson et al. |
| 5,301,395 A | 4/1994 | Richardson et al. |
| 5,319,475 A | 6/1994 | Kay et al. |
| 5,366,294 A | 11/1994 | Wirth et al. |
| 5,400,568 A | 3/1995 | Kanemitsu et al. |
| 5,405,478 A | 4/1995 | Richardson et al. |
| 5,417,035 A | 5/1995 | English |
| 5,425,216 A | 6/1995 | Ausnit |
| 5,425,825 A | 6/1995 | Rasko et al. |
| 5,426,830 A | 6/1995 | Richardson et al. |
| 5,431,760 A | 7/1995 | Donovan |
| 5,435,864 A | 7/1995 | Machacek et al. |
| 5,442,837 A | 8/1995 | Morgan |
| 5,442,838 A | 8/1995 | Richardson et al. |
| 5,443,154 A | 8/1995 | Hustad et al. |
| 5,448,807 A | 9/1995 | Herrington, Jr. |
| 5,448,808 A | 9/1995 | Gross |
| 5,456,928 A | 10/1995 | Hustad et al. |
| 5,461,845 A | 10/1995 | Yeager |
| 5,480,230 A | 1/1996 | May |
| 5,482,375 A | 1/1996 | Richardson et al. |
| 5,492,411 A | 2/1996 | May |
| 5,505,037 A | 4/1996 | Terminella et al. |
| 5,525,363 A | 6/1996 | Herber et al. |
| 5,557,907 A | 9/1996 | Malin et al. |
| 5,561,966 A | 10/1996 | English |
| 5,622,431 A | 4/1997 | Simonsen |
| 5,630,308 A | 5/1997 | Guckenberger |
| 5,638,586 A | 6/1997 | Malin et al. |
| 5,660,479 A * | 8/1997 | May et al. .................. 383/204 |
| 5,664,299 A | 9/1997 | Porchia et al. |
| 5,669,715 A | 9/1997 | Dobreski et al. |
| 5,672,009 A | 9/1997 | Malin |
| 5,709,915 A | 1/1998 | Tomic et al. |
| 5,711,609 A | 1/1998 | Simonsen |
| 5,713,669 A | 2/1998 | Thomas et al. |
| 5,722,128 A | 3/1998 | Toney et al. |
| 5,741,075 A | 4/1998 | Collins et al. |
| 5,749,658 A | 5/1998 | Kettner |
| 5,775,812 A | 7/1998 | St. Phillips et al. |
| 5,798,169 A | 8/1998 | Smith |
| 5,806,984 A | 9/1998 | Yeager |
| 5,809,621 A | 9/1998 | McCree et al. |
| 5,816,018 A | 10/1998 | Bois |
| 5,823,933 A | 10/1998 | Yeager |
| 5,826,401 A | 10/1998 | Bois |
| 5,827,163 A | 10/1998 | Kettner |
| 5,833,791 A | 11/1998 | Bryniarski et al. |
| 5,836,056 A | 11/1998 | Porchia et al. |
| 5,857,310 A | 1/1999 | Bois |
| 5,878,468 A | 3/1999 | Tomic et al. |
| 5,884,452 A | 3/1999 | Bois |
| 5,911,508 A | 6/1999 | Dobreski et al. |
| 5,924,795 A | 7/1999 | Thompson et al. |
| 5,934,806 A | 8/1999 | Tomic et al. |
| 5,938,337 A | 8/1999 | Provan et al. |
| 5,947,288 A | 9/1999 | Dykstra et al. |
| 5,951,453 A | 9/1999 | Yeager |
| 5,953,796 A | 9/1999 | McMahon et al. |
| 5,954,431 A | 9/1999 | Fabel |
| 5,954,433 A | 9/1999 | Yeager |
| 5,956,924 A | 9/1999 | Thieman |
| 5,957,584 A | 9/1999 | Lakey |
| 5,964,532 A | 10/1999 | St. Phillips et al. |
| 5,997,177 A * | 12/1999 | Kaufman ...................... 383/5 |
| 6,000,197 A | 12/1999 | Ausnit |
| 6,003,582 A | 12/1999 | Blohowiak et al. |
| 6,012,264 A | 1/2000 | Linkiewicz |
| 6,019,512 A | 2/2000 | Yeager |
| 6,032,437 A | 3/2000 | Bois |
| 6,059,112 A | 5/2000 | Dykstra et al. |
| 6,071,011 A | 6/2000 | Thomas et al. |
| 6,079,878 A | 6/2000 | Yeager |
| 6,085,491 A | 7/2000 | Bois |
| 6,088,887 A | 7/2000 | Bois |
| 6,103,050 A | 8/2000 | Krueger |
| 6,110,090 A | 8/2000 | Ausnit |
| 6,110,586 A | 8/2000 | Johnson |
| 6,115,892 A | 9/2000 | Malin et al. |
| 6,117,060 A | 9/2000 | Bodolay |
| 6,131,369 A | 10/2000 | Ausnit |
| 6,131,370 A | 10/2000 | Ausnit |
| 6,131,374 A | 10/2000 | Bois |
| 6,138,439 A | 10/2000 | McMahon et al. |
| 6,149,302 A | 11/2000 | Taheri |
| 6,161,271 A | 12/2000 | Schreiter |
| 6,178,722 B1 | 1/2001 | McMahon |
| 6,199,256 B1 | 3/2001 | Revnew et al. |
| 6,207,925 B1 | 3/2001 | Kendall |
| 6,212,857 B1 | 4/2001 | Van Erden |
| 6,213,640 B1 | 4/2001 | Bois |
| 6,216,423 B1 | 4/2001 | Thieman |
| 6,224,262 B1 | 5/2001 | Hogan et al. |
| 6,241,646 B1 | 6/2001 | Tokarski |
| 6,247,843 B1 | 6/2001 | Buchman |
| 6,257,763 B1 | 7/2001 | Stolmeier et al. |
| 6,264,366 B1 | 7/2001 | Custer |
| 6,273,607 B1 | 8/2001 | Buchman |
| 6,279,298 B1 | 8/2001 | Thomas et al. |
| 6,286,189 B1 | 9/2001 | Provan et al. |
| 6,289,561 B1 | 9/2001 | Provan et al. |
| 6,290,390 B1 | 9/2001 | Buchman |
| 6,290,391 B1 | 9/2001 | Buchman |
| 6,293,896 B1 | 9/2001 | Buchman |

| | | |
|---|---|---|
| 6,305,844 B1 | 10/2001 | Bois |
| 6,321,423 B1 | 11/2001 | Johnson |
| 6,327,754 B1 | 12/2001 | Belmont et al. |
| 6,334,709 B1 | 1/2002 | Bois |
| 6,339,911 B2 | 1/2002 | Bois |
| 6,343,455 B2 | 2/2002 | Bois |
| 6,347,437 B2 | 2/2002 | Provan et al. |
| 6,354,738 B1 | 3/2002 | Buckman et al. |
| 6,360,513 B1 | 3/2002 | Strand et al. |
| 6,378,177 B1 | 4/2002 | Athans et al. |
| 6,378,272 B1 | 4/2002 | Archibald et al. |
| 6,386,760 B1 | 5/2002 | Tomic |
| 6,412,254 B1 | 7/2002 | Tilman et al. |
| 6,419,152 B1 | 7/2002 | Tokarski |
| 6,427,420 B1 | 8/2002 | Olivieri et al. |
| 6,439,770 B2 | 8/2002 | Catchman |
| 6,461,042 B1 | 10/2002 | Tomic et al. |
| 6,467,956 B1 | 10/2002 | Tilman et al. |
| 6,477,821 B1 | 11/2002 | Bois |
| 6,488,410 B2 | 12/2002 | Schneider |
| 6,499,878 B1 | 12/2002 | Dobreski et al. |
| 6,524,002 B2 | 2/2003 | Tomic |
| 6,530,870 B2 | 3/2003 | Buchman et al. |
| 6,572,266 B2 | 6/2003 | Buchman |
| 6,609,353 B1 | 8/2003 | McMahon et al. |
| 6,616,333 B2 | 9/2003 | Kinigakis et al. |
| 6,713,152 B2 | 3/2004 | Chen et al. |
| 6,820,395 B2 | 11/2004 | Ausnit |
| 6,928,791 B2 | 8/2005 | Ausnit |
| 6,974,256 B2 | 12/2005 | Kinigakis et al. |
| 2001/0002504 A1 | 6/2001 | Provan et al. |
| 2001/0005973 A1 | 7/2001 | Schneider et al. |
| 2001/0017947 A1 | 8/2001 | Strand et al. |
| 2001/0017950 A1 | 8/2001 | Strand et al. |

FOREIGN PATENT DOCUMENTS

| | | |
|---|---|---|
| EP | 0689993 | 1/1996 |
| EP | 0908392 | 4/1999 |
| GB | 2 085 519 A | 4/1982 |
| WO | WO 98/57863 | 12/1998 |
| WO | WO 99/36325 | 7/1999 |
| WO | WO 99/56947 | 11/1999 |
| WO | WO 99/65353 | 12/1999 |
| WO | WO 9962781 A1 * | 12/1999 |
| WO | WO 00/02722 | 1/2000 |
| WO | WO 01/32521 A1 | 5/2001 |

\* cited by examiner

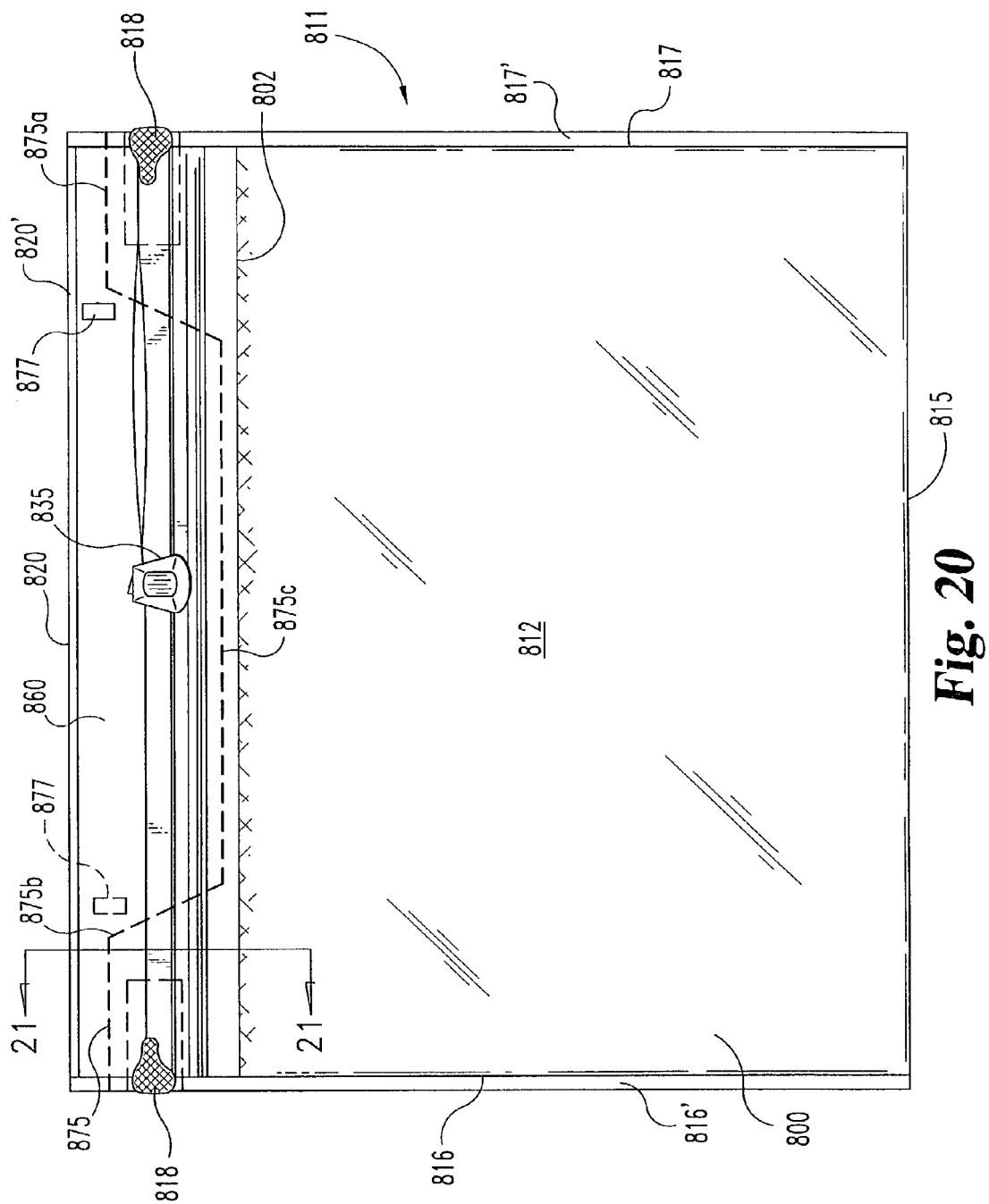

SCORED TAMPER EVIDENT FASTENER TAPE

REFERENCE TO RELATED APPLICATIONS

The present application claims the benefit of United States (U.S.) Provisional Patent Application Ser. No. 60/314,787, filed Aug. 24, 2001. The present application is a continuation-in-part of U.S. patent application Ser. No. 09/866,457, filed May 25, 2001, abandoned, which is a continuation of U.S. patent application Ser. No. 09/090,851, filed Jun. 4, 1998, now U.S. Pat. No. 6,257,763. All of the above-referenced applications are hereby incorporated by reference in their entirety.

BACKGROUND OF THE INVENTION

1. Field of the Invention

The present invention generally relates to reclosable bags, and more specifically, but not exclusively, concerns sealed, tamper evident reclosable bags.

2. Background

Various inventions have been made in the area of reclosable plastic bags with slider zippers. For example, the Herrington U.S. Pat. No. 5,007,143 shows a zipper profile which is opened and closed by a slider that is grasped by the user for opening and closing the bag. It is desirable in certain situations to provide tamper evidence to the user of the reclosable bag. The Hustad et al. U.S. Pat. No. 5,456,928 is an example of a patent disclosing a reclosable bag for use with food products which has tamper evident means incorporated therein. There are certain situations, for example, where a slider zipper reclosable bag is used to contain a product that is being marketed and it is also desirable to provide tamper evidence.

Certain types of items, such as perishable foods, need to be hermetically sealed within bags so as to prevent contamination. To ensure that contents of the bag have not been contaminated or tampered with by the bag being opened, such bags typically incorporate some sort of tamper evident feature. Tear lines on the bags, for example, have been used as one type of tamper evident indicator. At the tear line, the walls of the bag are weakened to allow for tearing of the bag, but the walls are not punctured along the tear line so as to maintain a hermetic seal. In one technique to create the hermetically sealed tear line, the tear line is thermally treated in order to weaken the material along the tear line. For instance, one technique uses a laser to heat and weaken layers of plastic sheets in the bag as the laser traverses along the tear line. As should be appreciated, through laser scoring a tamper evident tear line for hermetically sealed bags is able to be created. However, laser scoring equipment can be too expensive for some vendors. In addition, to ensure that the walls of the bag are not punctured, process control tolerances are required during laser scoring. Some bag manufacturers do not have the capability, environment, training, equipment and/or experience to be able to maintain appropriate control tolerances. Therefore, it is desirable for vendors that do not have the systems in place to produce hermetically sealed score lines to be able to produce hermetically sealed tamper evident bags with conventional equipment.

SUMMARY OF THE INVENTION

One embodiment of the invention includes a plastic film bag having a pair of side walls which define a mouth of the bag. There is provided a reclosable fastener extending along the mouth of the bag and secured to the side walls. The fastener includes a pair of flexible fastening strips secured to the side walls and including reclosable interlocking rib and groove profile elements on the respective strips. A slider straddles the fastener for opening and closing the fastener. The slider includes a depending separator extending between the flexible plastic strips. There is also provided a sheet of plastic film closing the mouth of the bag which sheet is capable of rupture to provide access and tamper evidence.

In an alternative embodiment, each of the pair of side walls of the plastic film bag has an upper region that forms a sheet of plastic film disposed between the side walls for closing the mouth of the bag.

In yet another embodiment, one of the pair of side walls of the plastic film bag is secured to the inner face of one of the pair of flexible plastic strips and the other of the pair of side walls is secured to the inner face of the other of the pair of flexible plastic strips. The sheet preferably forms at least one curved region. The sheet allows the flexible plastic strips to separate from each other a greater distance when the rib and groove profile elements are in a non-interlocked configuration. In another embodiment, one of the pair of side walls is secured to an outer face of one of the pair of flexible plastic strips and the other of the pair of side walls is secured to an outer face of the other of the pair of flexible plastic strips.

A further embodiment concerns a reclosable fastener tape for a tamper evident hermetically sealed bag. The fastener tape includes a first fastener strip and a second fastener strip. The first fastener strip and the second fastener strip have mating profiles constructed and arranged to mate with one another in a reclosable fashion. A sheet connects the first fastener strip to the second fastener strip. The sheet has an unpunctured tear line formed between the first fastener strip and the second fastener strip for providing a tamper evident hermetic seal when the fastener tape is sealed with the bag.

In another embodiment, a reclosable hermetically sealed bag includes a fastener tape. The fastener tape has a first fastener strip and a second fastener strip each including profile elements for mating with one another in a reclosable fashion. A sheet seals the first fastener strip to the second fastener strip. The sheet has at least one laser scored tear line formed between the first fastener strip and the second fastener strip for providing a tamper evident seal. A bag portion is sealed to the fastener tape to form a sealed cavity.

A further embodiment concerns a method for making a tamper evident seal for a recloseable bag. In this method, first and second interlockable fastener strips are provided, and a first sheet of flexible film with first and second opposing parallel edges is provided. A first pattern of weakening is scored on the first sheet spaced apart from the first edge. A second pattern of weakening is scored on the first sheet spaced apart from the second edge. The first sheet of flexible film is attached to the first fastener strip after scoring the first pattern. The assembly of fastener strips and first sheet is provided for subsequent attachment to a second sheet of flexible film.

In another embodiment, first and second interlockable fastener strips are provided, and a sheet of flexible film with first and second opposing parallel edges is provided. A first pattern of weakening on the sheet is scored on the sheet. A second pattern of weakening on the sheet is scored on the sheet. The sheet of flexible film is attached to the first fastener strip after scoring the first pattern. The sheet is folded to form a bottom of the bag.

These and other embodiments for the present invention will be shown and described in the Description of the Preferred Embodiment, the drawings, and the claims to follow.

BRIEF DESCRIPTION OF THE DRAWINGS

FIG. 20 is a front elevational view of a reclosable plastic bag including a tamper evident zipper slider according to another embodiment of the present invention.

DESCRIPTION OF THE PREFERRED EMBODIMENTS

Figure 1:
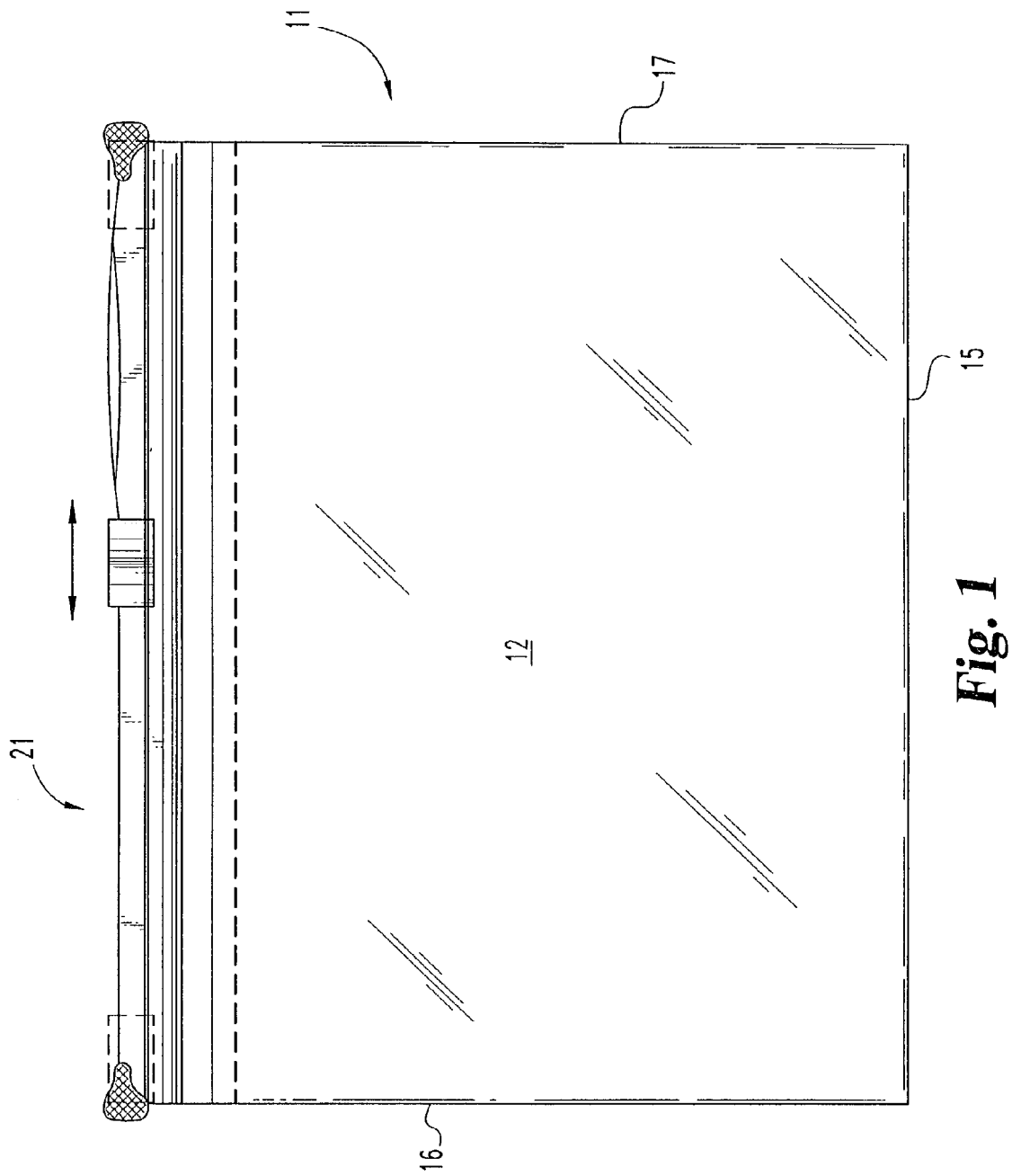
FIG. 1 is a front elevational view of a reclosable plastic bag including the tamper evident zipper slider of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A number of embodiments of the present invention are shown in detail, although it will be apparent to those skilled in the relevant art that some features that are not relevant to the present invention may not be shown for the sake of clarity. Examples of recloseable bags have been describe in a number of references, including: U.S. Pat. No. 5,956,924 to Thieman; U.S. Pat. No. 6,257,763 to Stolmeier et al.; U.S. patent application Ser. No. 10/107,694, filed Mar. 27, 2002; and U.S. Provisional Patent Application Ser. No. 60/389,860, filed Jun. 18, 2002, all of which are hereby incorporated by reference in their entirety.

Referring now to the drawings in detail, a plastic bag 11 is illustrated which consists of a pair of side walls 12 and 13 which are connected together at the bottom and at the sideward edges 16 and 17 of the bag. The connection at the bottom 15 may be merely by folding a single sheet of plastic to produce the two side walls 12 and 13 or may be actual melting and cutting or adhering the two side walls together by adhesive. The side edges 16 and 17 are frequently formed by melting the two side walls together and then by cutting apart from the adjacent side walls of further bags being produced. The two side walls 12 and 13 define a mouth 20 of the bag along which a reclosable fastener 21 extends. The fastener includes a pair of flexible plastic strips 22 and 25 which are secured to the side walls 12 and 13 and include reclosable interlocking rib and groove profile elements 26, 27, 30, and 31. The reclosable fastener further includes a flange 32 which functions to close over the top of the fastener when it is in closed position.

Figure 2:
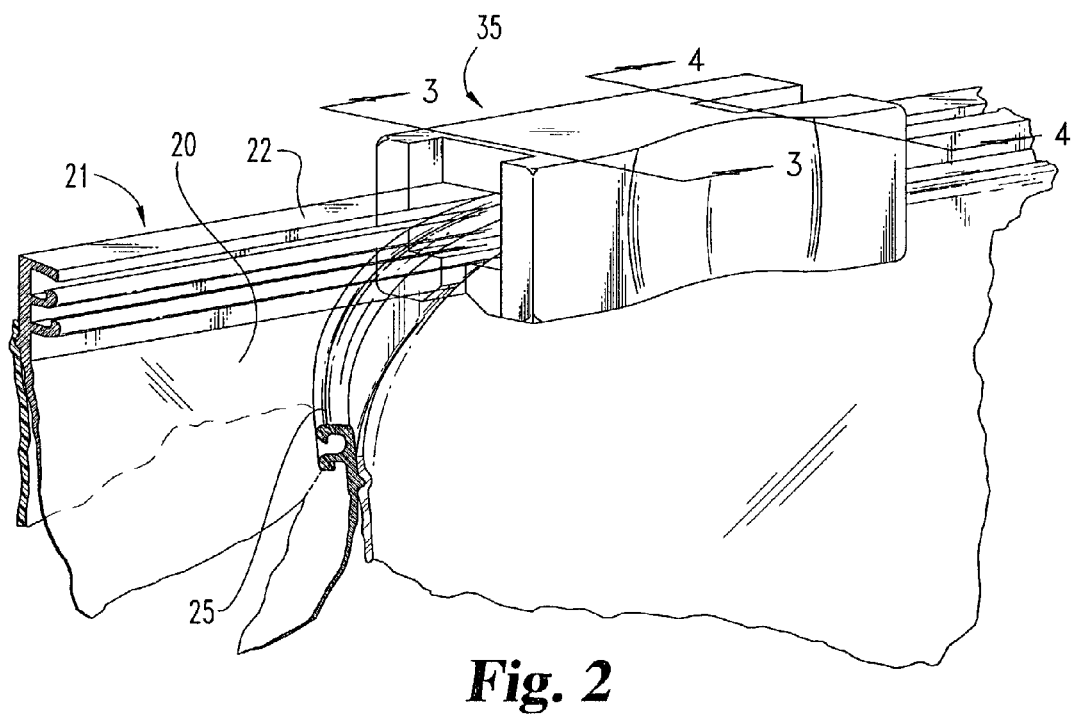
FIG. 2 is a fragmentary perspective view of a portion of the structure of FIG. 1.
Figure 2A:
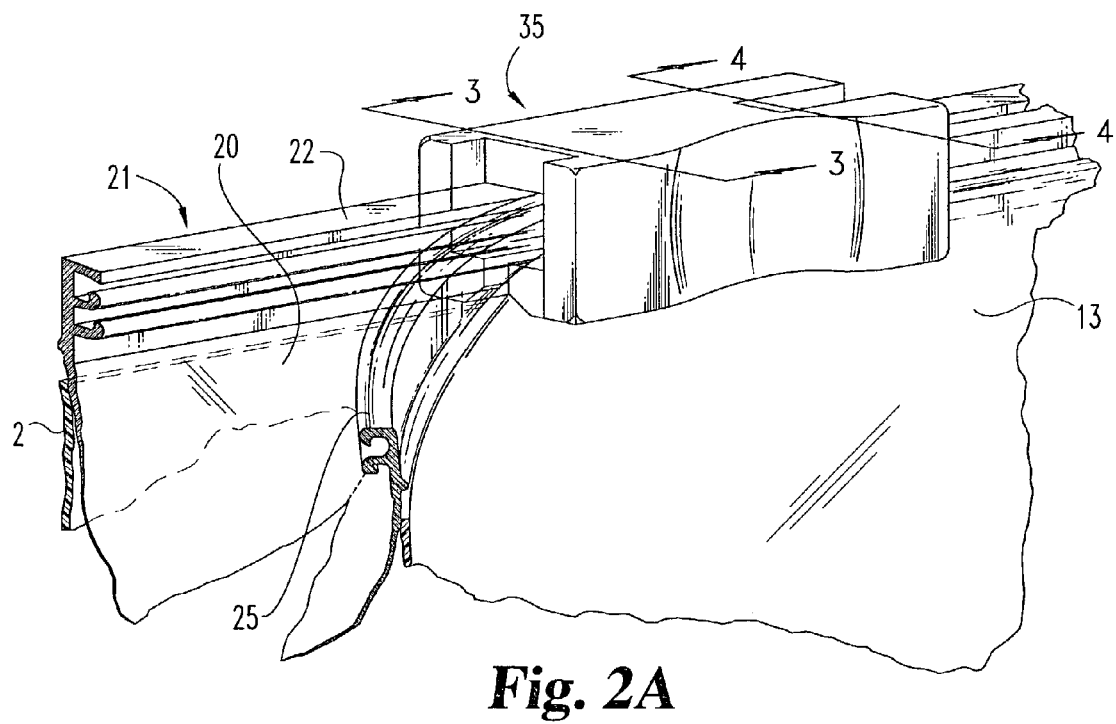
FIG. 2A is a view similar to FIG. 2 of an alternative embodiment of the present invention.
Figure 3:
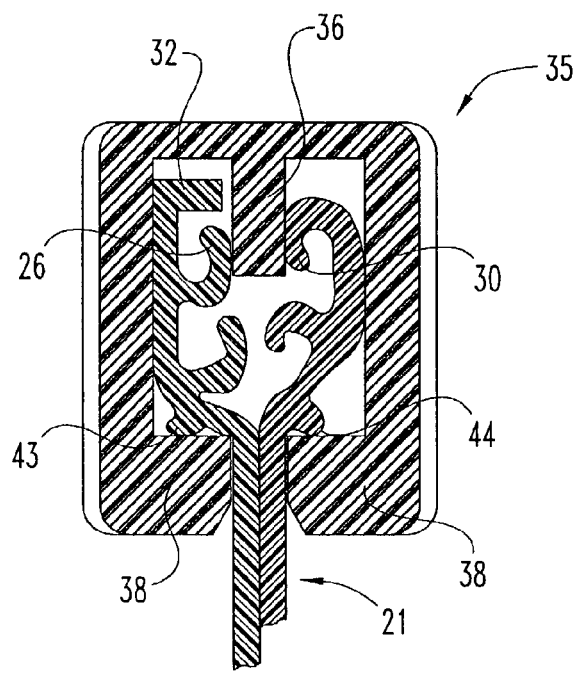
FIG. 3 is a vertical section taken along the line 3-3 of FIG. 2 in the direction of the arrows.
Figure 4:
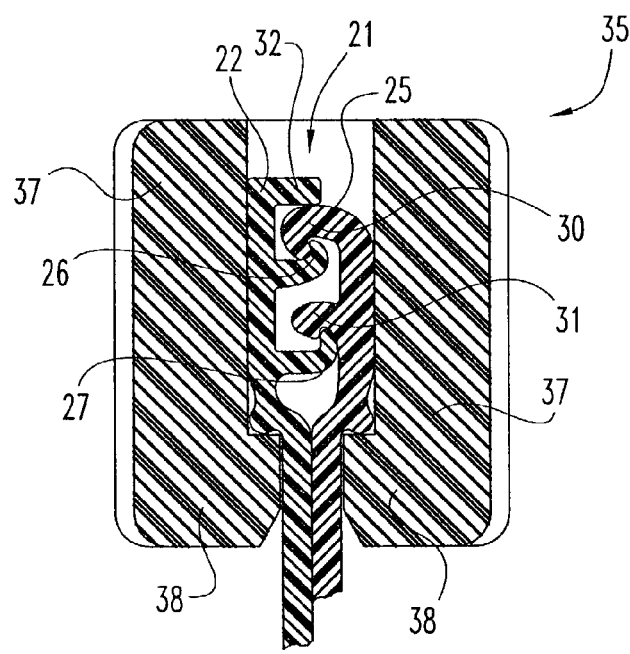
FIG. 4 is a vertical section taken along the line 4-4 of FIG. 2 in the direction of the arrows.
Figure 5:
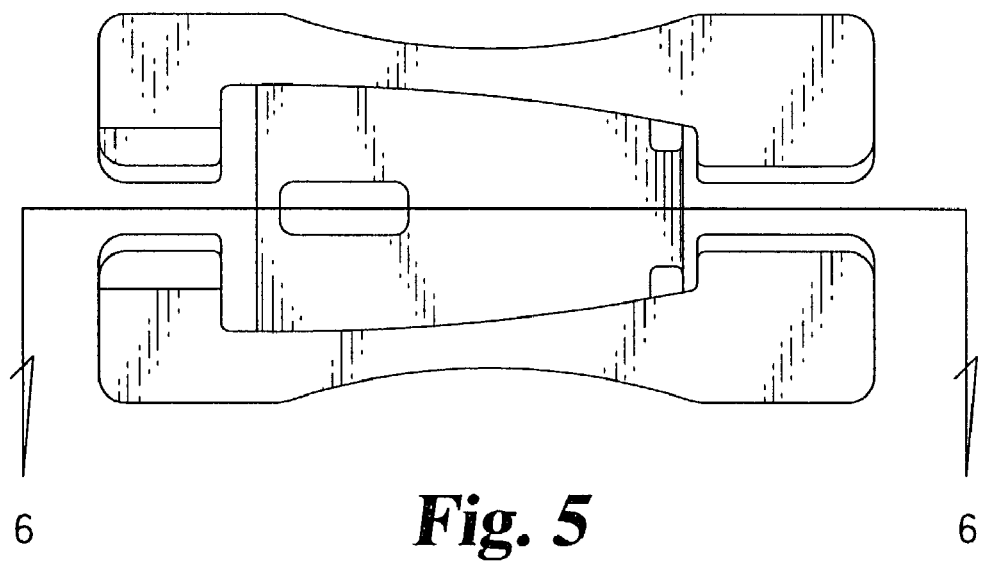
FIG. 5 is a bottom plan view of the slider of the present invention.
Figure 6:
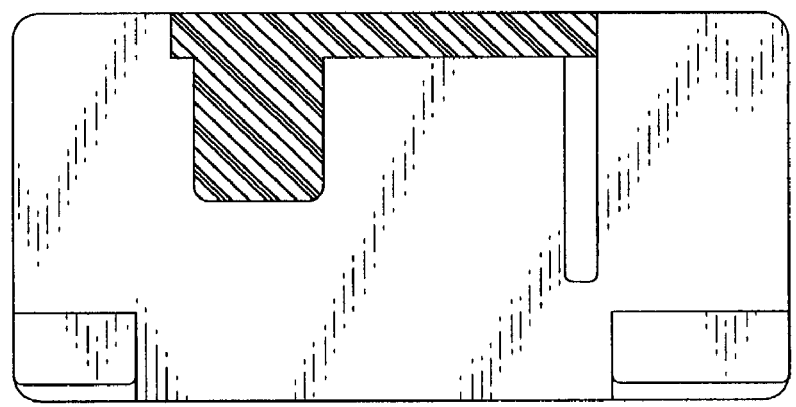
FIG. 6 is a section taken along the line 6-6 of FIG. 5 in the direction of the arrows.

A slider 35 is arranged to straddle the fastener 21 for opening and closing the fastener. The slider 35 has a fixed separator member 36 which extends down between the profile elements 26 and 30 for the purpose of separating them and opening the fastener when the slider is moved rightwardly as viewed in FIG. 2. FIG. 3 shows the slider section taken along the line 3-3 of FIG. 2 and shows the profile elements in open condition. When the slider is moved leftwardly as viewed in FIG. 2 the slider functions to close the profile elements and to connect them as shown in FIG. 4. The connection occurs by reason of the walls 37 of the slider squeezing the profile elements together. The embodiment depicted in FIG. 2A is identical to that shown in FIG. 2 with the exception that side walls 12 and 13 are attached to flexible plastic strips 22 and 25, respectively, such that interference of the side walls with slider 35 is minimized.

The slider is retained on the fastener elements by shoulders 43 and 44 which are also formed on the fastener elements. The slider has inwardly projecting flanges 38 which engage the shoulders 43 and 44 to retain the slider on the fastener.

Figure 8:
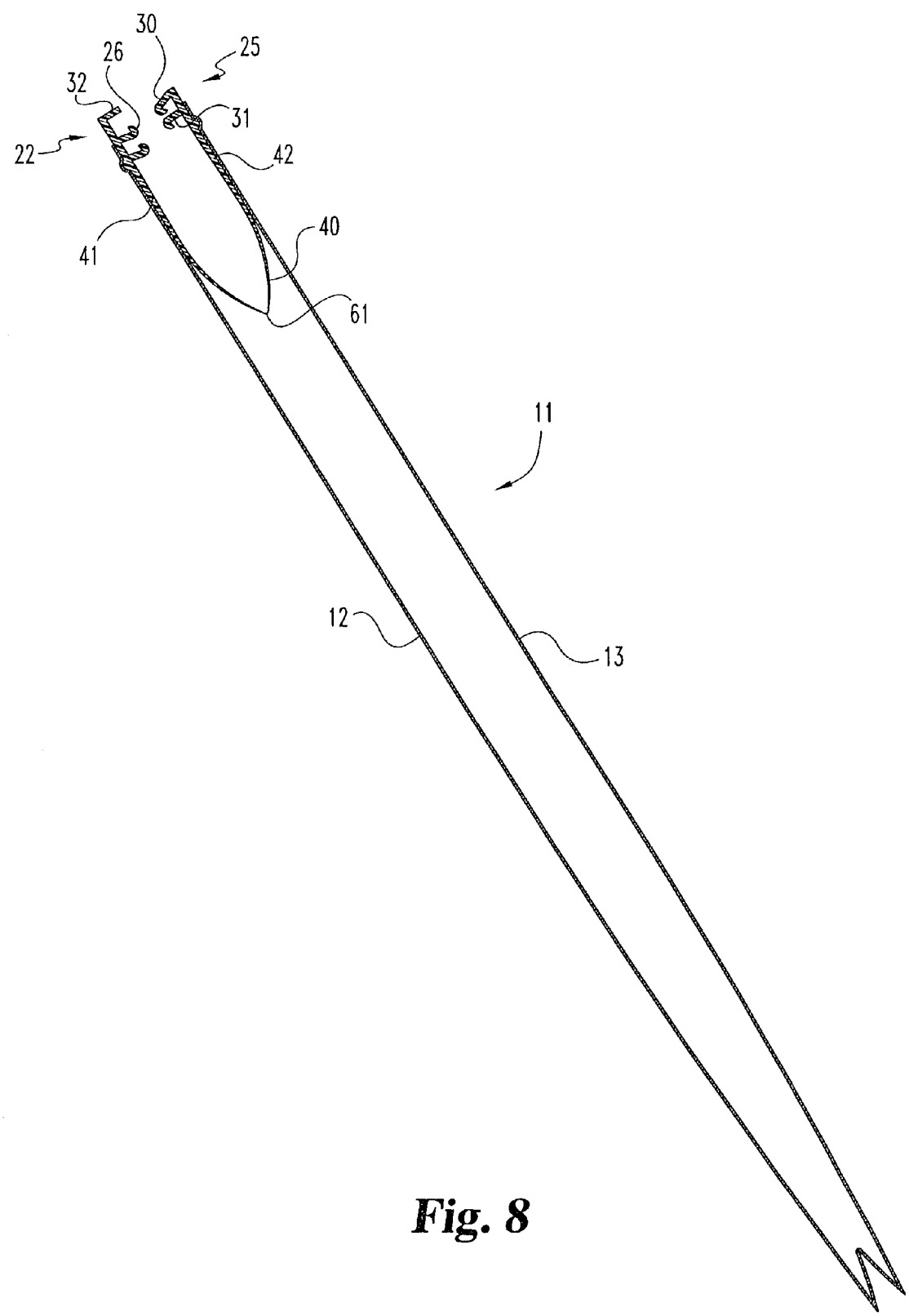
FIG. 8 is a vertical section taken through the zipper slider and the bag of FIG. 1.
Figure 8A:
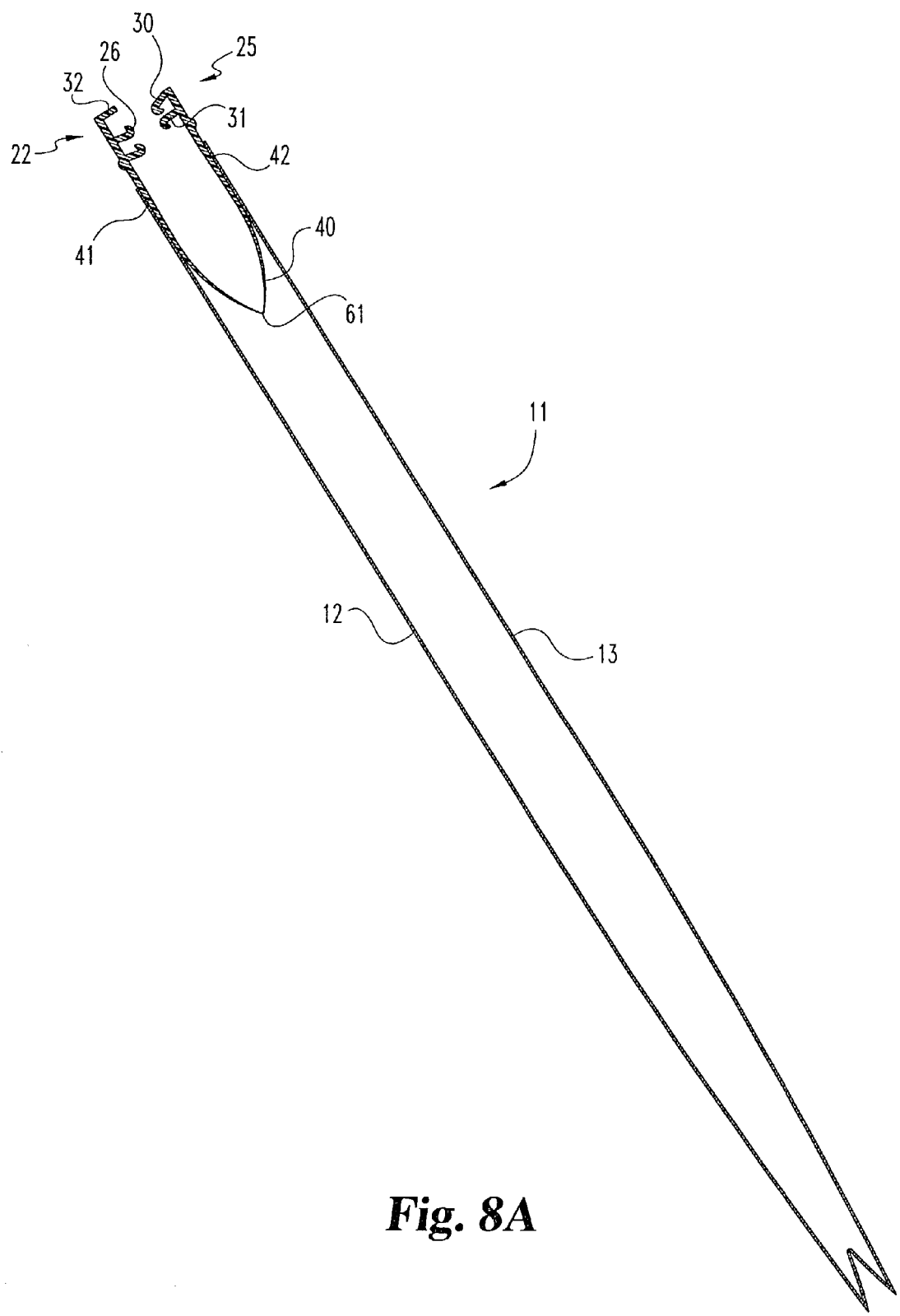
FIG. 8A is a view similar to FIG. 8 of an alternative embodiment of the present invention.

Referring to FIG. 8 the reclosable fastener has formed homogeneously and coextensively therewith a sheet of plastic 40. This sheet of plastic 40 may be extruded along with the fastener elements 22 and 25 but has a somewhat less thick construction than the strips 22 and 25 and particularly the web portion thereof 41 and 42. The embodiment shown in FIG. 8A is identical to that shown in FIG. 8 with the exception that side walls 12 and 13 are attached to flexible plastic strips 22 and 25, respectively, such that interference of the side walls with the slider (not shown) is minimized.

It is intended that the present bag be used frequently in situations where the bag is filled at the factory with a product and then is marketed to the consumer. The consumer then buys the bag and is reassured that it has not been tampered with because the closure 40 is in place and needs to be ruptured before the consumer can use the contents of the bag. If the consumer does not wholly consume the contents, he can then reclose the bag and use it further to contain the partially filled bag.

Figure 10:
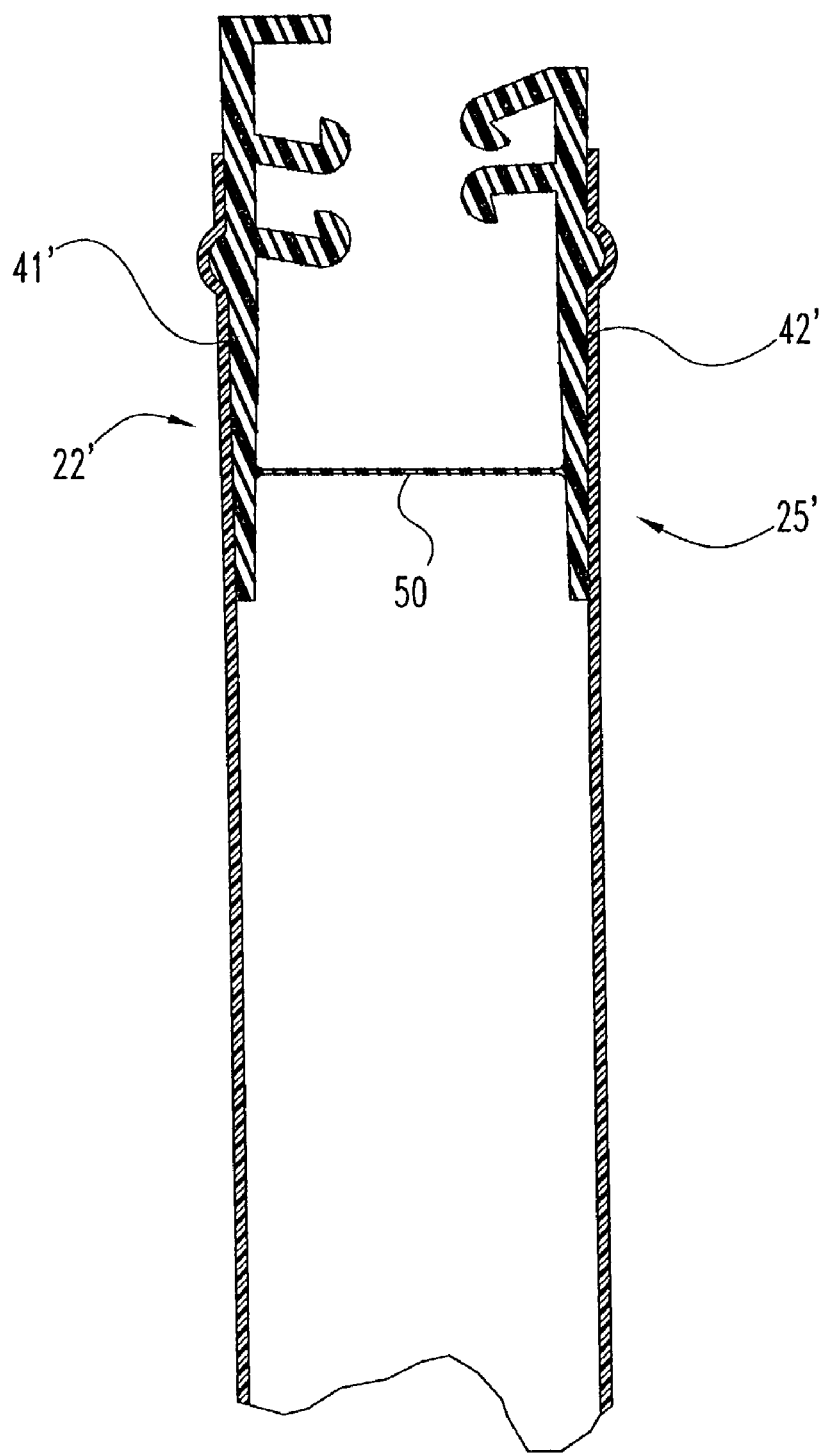
FIG. 10 is a view similar to FIG. 8 of an alternative embodiment of the present invention.
Figure 10A:
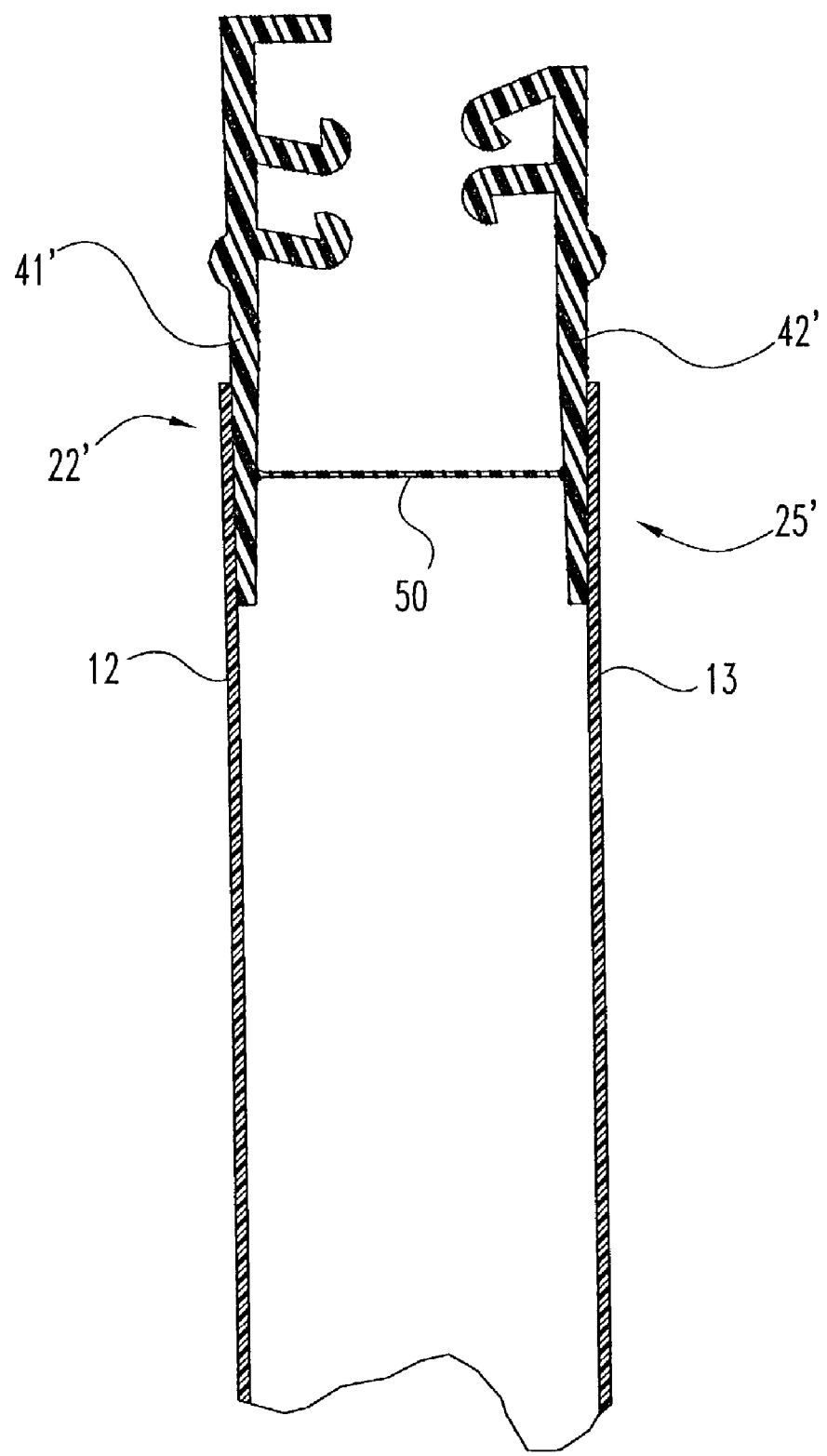
FIG. 10A is a view similar to FIG. 10 of a further alternative embodiment of the present invention.

An alternative embodiment of the reclosable fastener of FIG. 8 is shown in FIG. 10 and involves a tamper evidence closure 50 that extends between the walls or webs 41' and 42' of the reclosable fastener elements 22' and 25'. The construction of FIG. 10 is extruded in a similar fashion to the construction of FIG. 8. The embodiment shown in FIG. 10A is identical to that shown in FIG. 10 with the exception that side walls 12 and 13 are attached to flexible plastic strips 22' and 25', respectively, such that interference of the side walls with the slider (not shown) is minimized.

Figure 7:
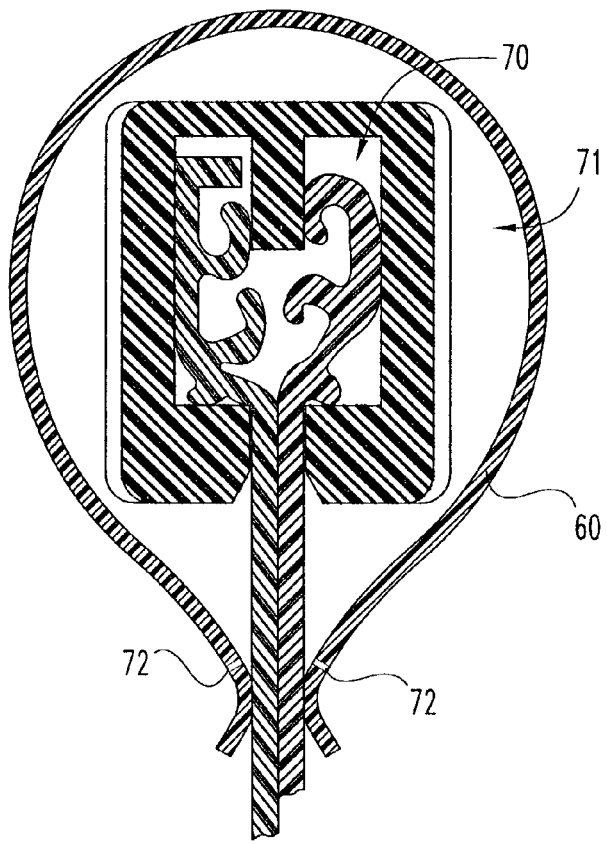
FIG. 7 is a vertical section similar to FIG. 3 of an alternative embodiment of the present invention.
Figure 7A:
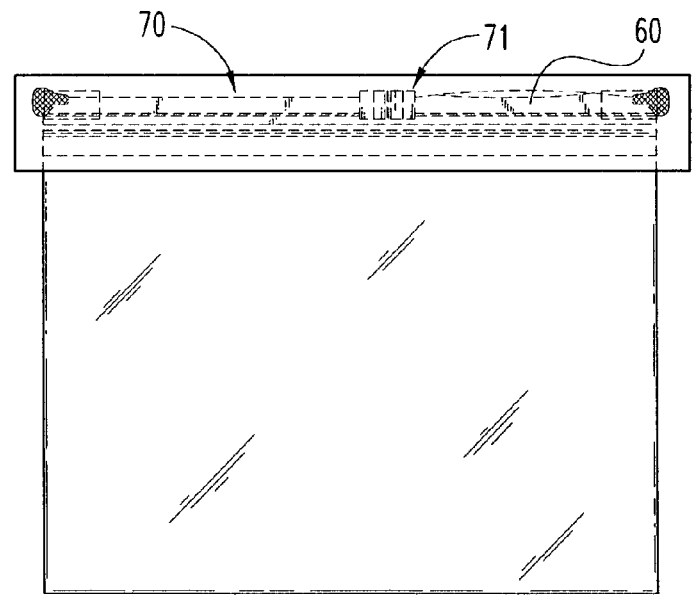
FIG. 7A is a front elevation similar to FIG. 1 of the alternative embodiment of the present invention.
Figure 7B:
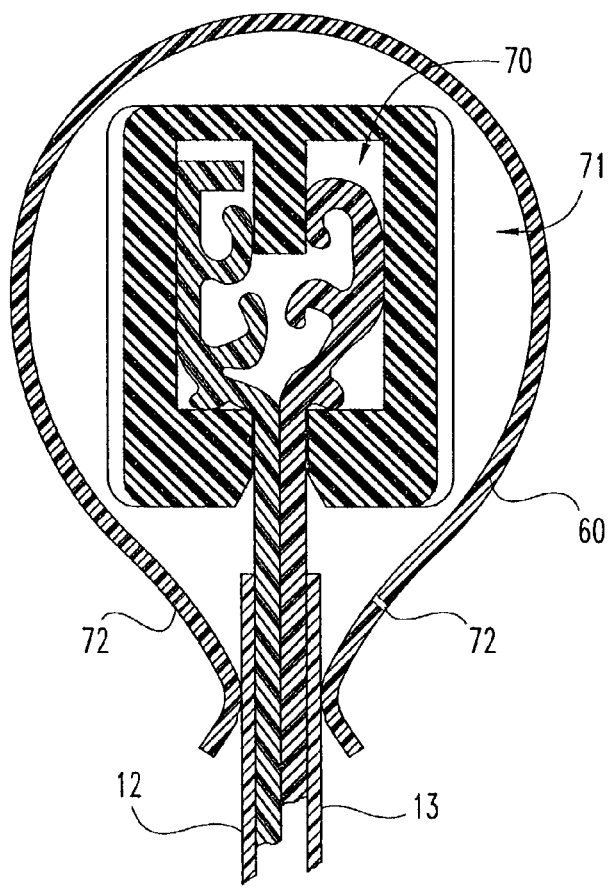
FIG. 7B is a view similar to FIG. 7 of an alternative embodiment of the present invention.
Figure 7C:
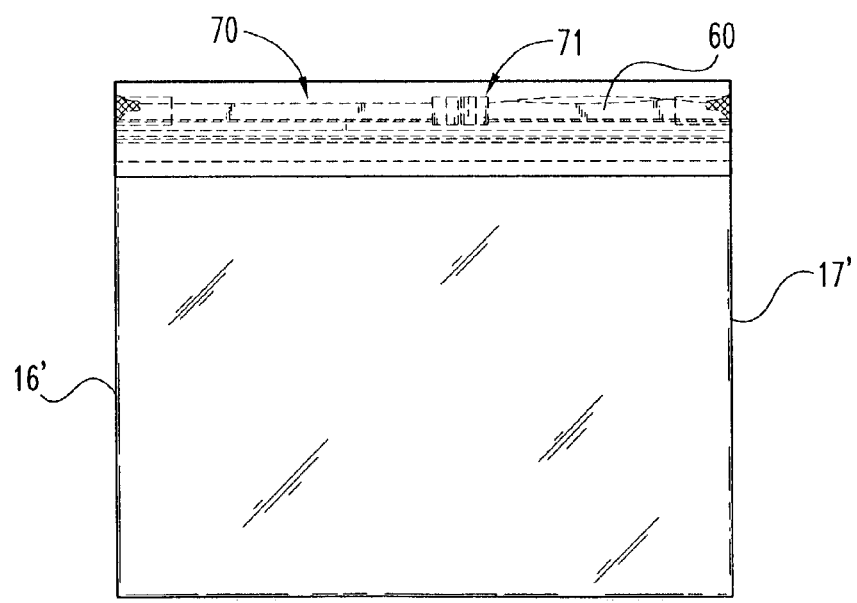
FIG. 7C is a view similar to FIG. 7A of a further alternative embodiment of the present invention.

Still another alternative embodiment of the invention is illustrated in FIGS. 7 and 7A. The reclosable closure and slider are identical to those above described except that the sheet 40 is eliminated. In place of the sheet 40, the tamper evident slider of FIG. 7 has a sheet 60 which forms a hood that covers and surrounds the reclosable closure 70 and the slider 71 of the bag of FIGS. 7 and 7A. In certain situations, the embodiment of FIG. 7 will be provided with perforations 72 which facilitate removing the tamper evident sheet 60. If desired, perforations may also be provided in the embodiment of FIG. 8 such as for example at the location 61. The embodiment depicted in FIG. 7B is identical to that shown in FIG. 7 with the exception that sheet 60 is attached to side walls 12 and 13 and perforations 72 have been relocated. The embodiment shown in FIG. 7C is identical to that shown in FIG. 7A with the exception that the length of sheet 60 is decreased so that its edges are coextensive with the sideward edges 16' and 17' of the bag.

Figure 11:
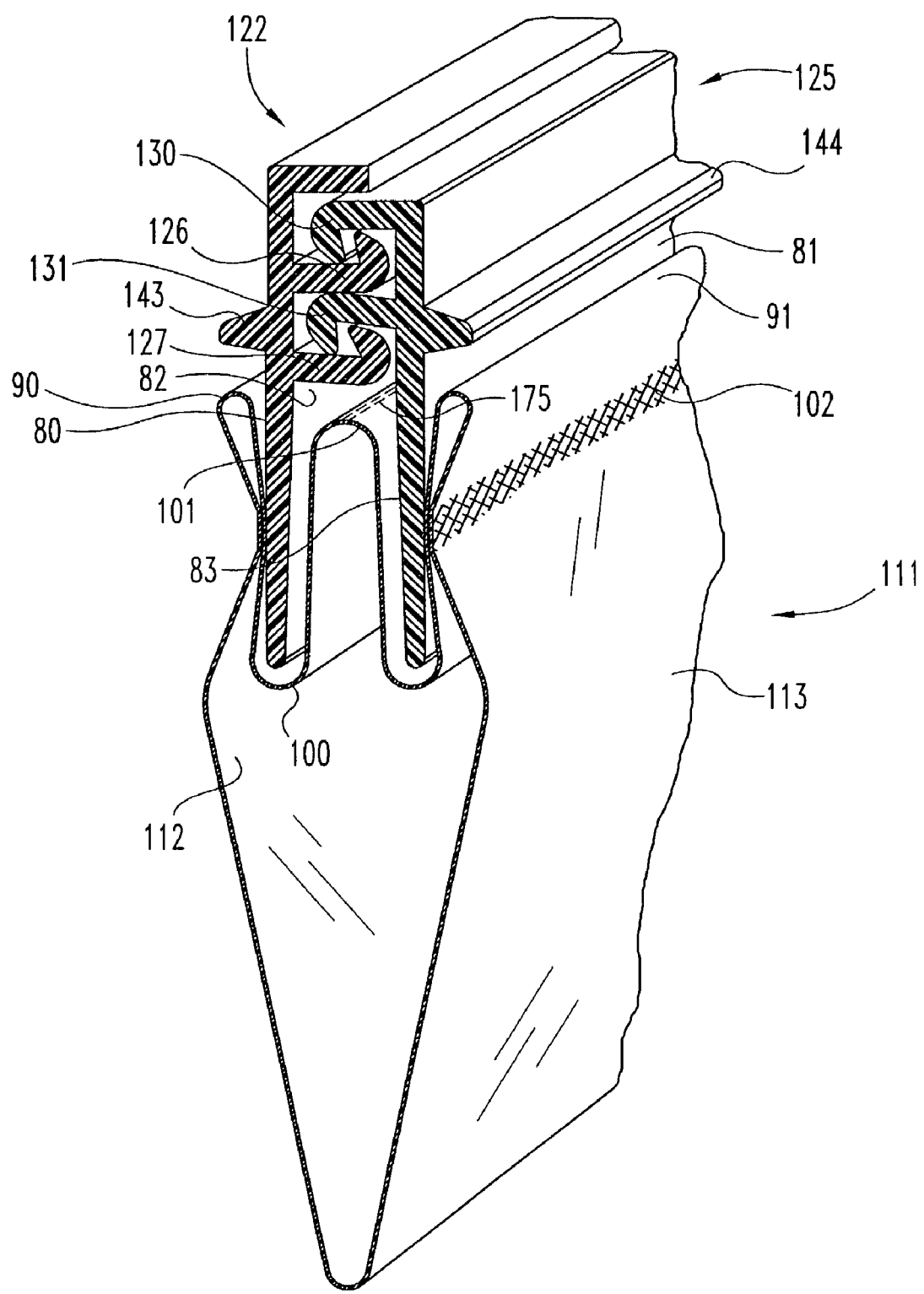
FIG. 11 is a fragmentary perspective sectional view of an alternative embodiment of the present invention.

In the embodiment shown in FIG. 11, the side wall 113 is secured to outer face 81 of flexible plastic strip 125 at region 102 and side wall 112 is secured to outer face 80 of flexible plastic strip 122 at a similar location (not shown). The side walls may be secured to the flexible plastic strips by methods known in the art, including heat sealing and use of adhesives. The regions of the side walls closest to shoulders 143 and 144, upper regions 90 and 91 of side walls 112 and 113, respectively, form a sheet of plastic film 100 disposed between the side walls that acts as a tamper-evident closure.

In forming film 100, each of the pair of side walls 112 and 113 folds over itself as seen at upper regions 90 and 91. Film 100 typically extends along planes parallel to a plane passing between inner face 82 and outer face 80 of flexible plastic strip 122 and a plane passing between inner face 83 and outer face 81 of flexible plastic strip 125. However, film 100 may also extend along planes oblique or a plane perpendicular to a plane passing between inner face 82 and outer face 80 of flexible plastic strip 122 and a plane passing between inner face 83 and outer face 81 of flexible plastic strip 125 in this and the other embodiments discussed. Film 100 preferably has at least one curved region 101. The length of side walls 112 and 113 that form film 100 is typically that which allows the flexible plastic strips to separate from each other a greater distance when the rib and groove profile elements 126, 127, 130 and 131 are in a non-interlocked configuration and can be determined by one skilled in the art. In this way, film 100 acts as a gusset, thus allowing easier access to the film of plastic film bag 111.

The sheet of plastic film 100 preferably has a plurality of perforations 175 for facilitating its rupture. The plurality of perforations 175 is preferably located in curved region 101 but may be located at other places on film 100 as one skilled in the art would appreciate. Alternatively, film 100 may be ruptured by cutting.

Figure 12:
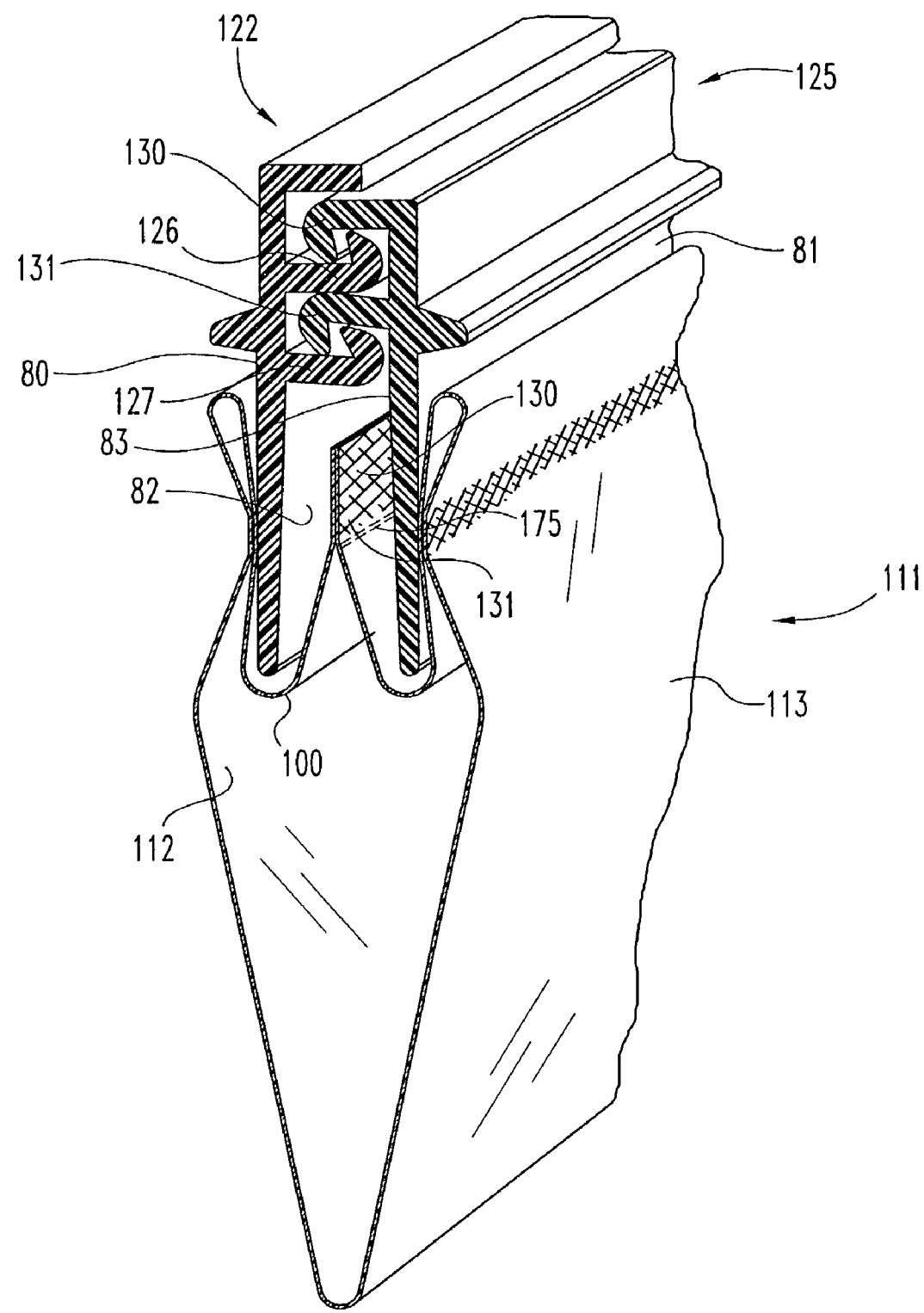
FIG. 12 is a view similar to FIG. 11 of a further alternative embodiment of the present invention.

The embodiment depicted in FIG. 12 is identical to that shown in FIG. 11 with the exception that curved region 101 of film 100 is replaced by a double layer of film joined together and defining a seal 130 that extends along the width of film 100 and film 100 extends along planes oblique to a plane passing between inner face 82 and outer face 80 of flexible plastic strip 122 and a plane passing between inner face 83 and outer face 81 of flexible plastic strip 125. Seal 130 may involve the two ends of film being secured together or may involve collapsing and sealing curved region 101. Base 131 of seal 130 may be weakened as a result of formation of the seal and may allow one to grasp and tear the seal to open bag 111. The ability to tear seal 130 to rupture film 100 will depend on the film thickness and the extent to which formation of seal 130 has weakened base 131 of the seal or the area around the base of the seal. Alternatively, a plurality of perforations 175 may be placed near or along base 131 of seal 130 to aid in rupturing the film. Film 100 may also be ruptured by cutting.

Figure 13:
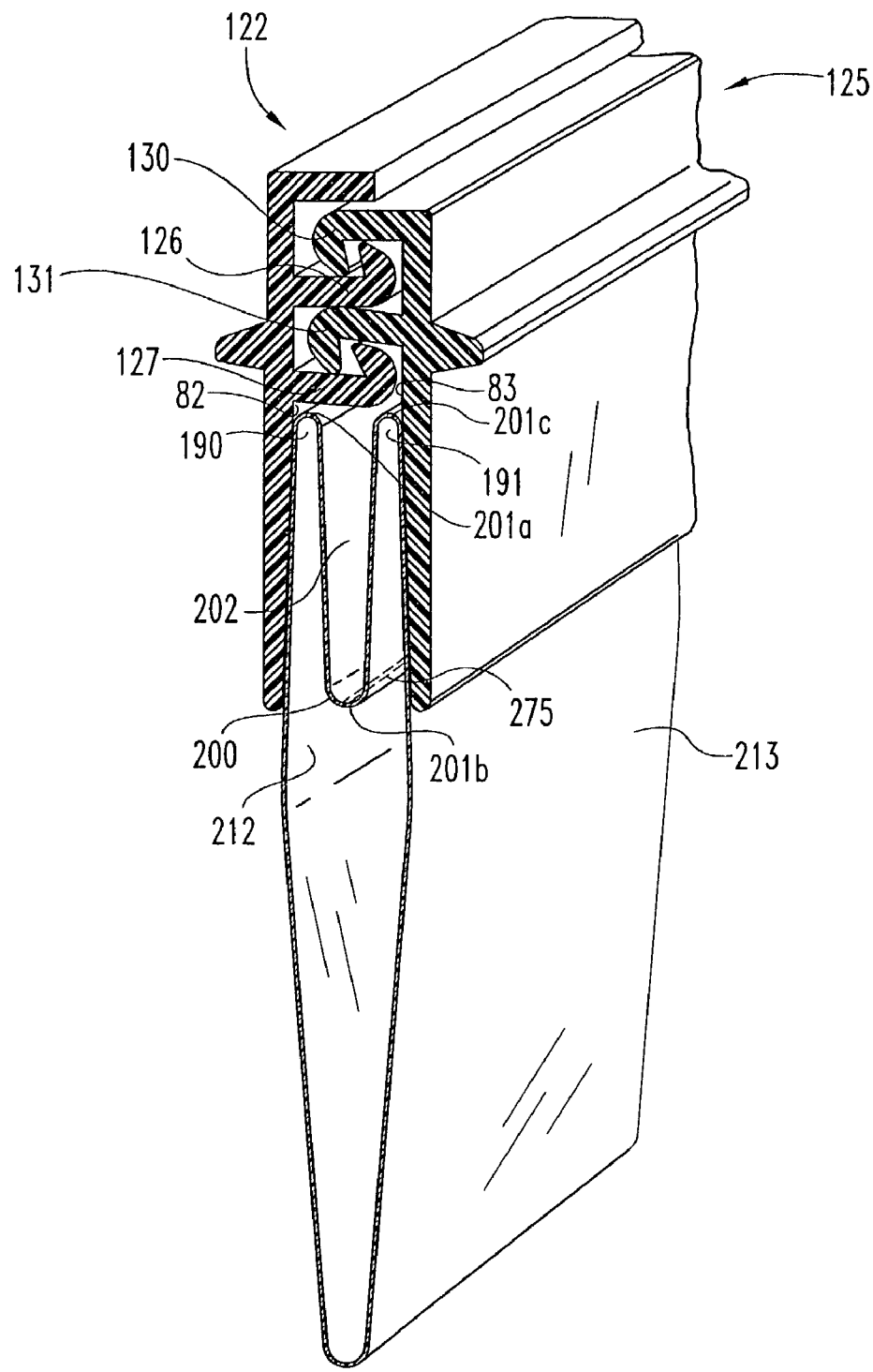
FIG. 13 is a view similar to FIG. 12 of another alternative embodiment of the present invention.

In the embodiment shown in FIG. 13, side wall 212 is secured to inner face 82 of flexible plastic strip 122 and side wall 213 is secured to inner face 83 of flexible plastic strip 125. The regions of the side walls closest to profile element 127, upper regions 190 and 191 of side walls 212 and 213, respectively, form a sheet of plastic film 200 disposed between the side walls. Film 200 is further disposed between the flexible plastic strips 122 and 125. Film 200 preferably has at least one curved region. In the embodiment shown in FIG. 13, film 200 has three curved regions 201a-201c and includes a U-shaped region 202 that functions as a gusset as described above. Film 200 and slider 35 (not shown in this figure) will not interfere with each other in this and similar embodiments (e.g., FIGS. 14 and 15) and the necessity of sealing two layers of film 200 is avoided.

The sheet of plastic film 200 preferably has a plurality of perforations 275 for facilitating its rupture. The plurality of perforations 275 is preferably located in any of the curved regions 201a-201c but may be located at other places on film 200 as one skilled in the art would appreciate. Alternatively, film 200 may be ruptured by cutting.

Figure 14:
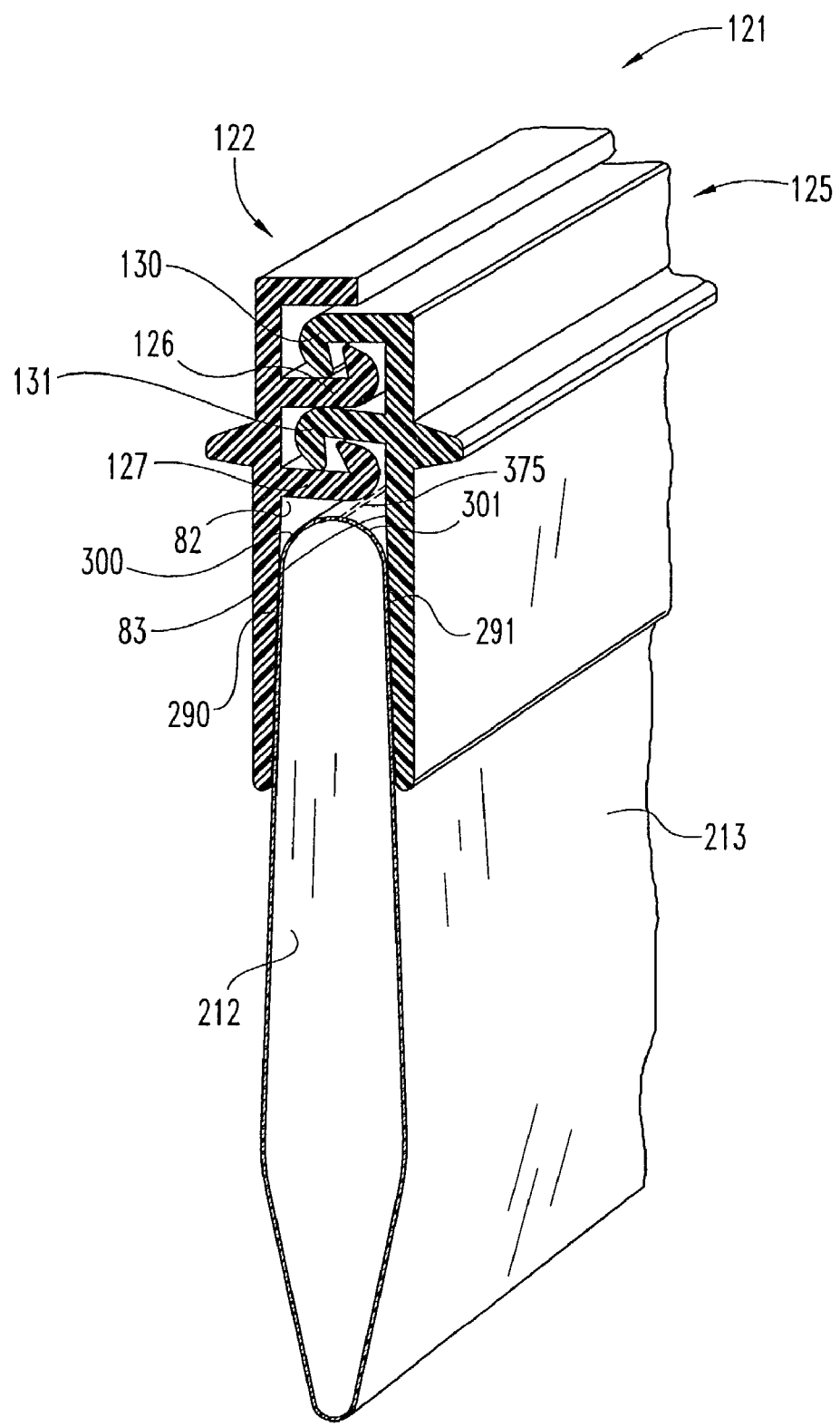
FIG. 14 is a view similar to FIG. 13 of a further alternative embodiment of the present invention.

The embodiment shown in FIG. 14 is similar to that shown in FIG. 13 except that only one curved region 301 is present. Side walls 212 and 213 are secured to inner faces 82 and 83 of flexible plastic strips 122 and 125, respectively, in a region of the side walls closer to profile element 127, upper regions 290 and 291 of side walls 212 and 213, respectively. This configuration allows for minimal spreading of fastener 121. That is, the flexible plastic strips of fastener 121 minimally spread from each other when the rib and groove profile elements 126, 127, 130 and 131 are in a non-interlocked configuration. Moreover, less excess film is present in this embodiment, thus minimizing interference of the film with the fastener.

The sheet of plastic film 300 preferably has a plurality of perforations 375 for facilitating its rupture. The plurality of perforations 375 is preferably located at curved region 301 but may be located at other places on film 300 as one skilled in the art would appreciate. Alternatively, film 300 may be ruptured by cutting.

Figure 15:
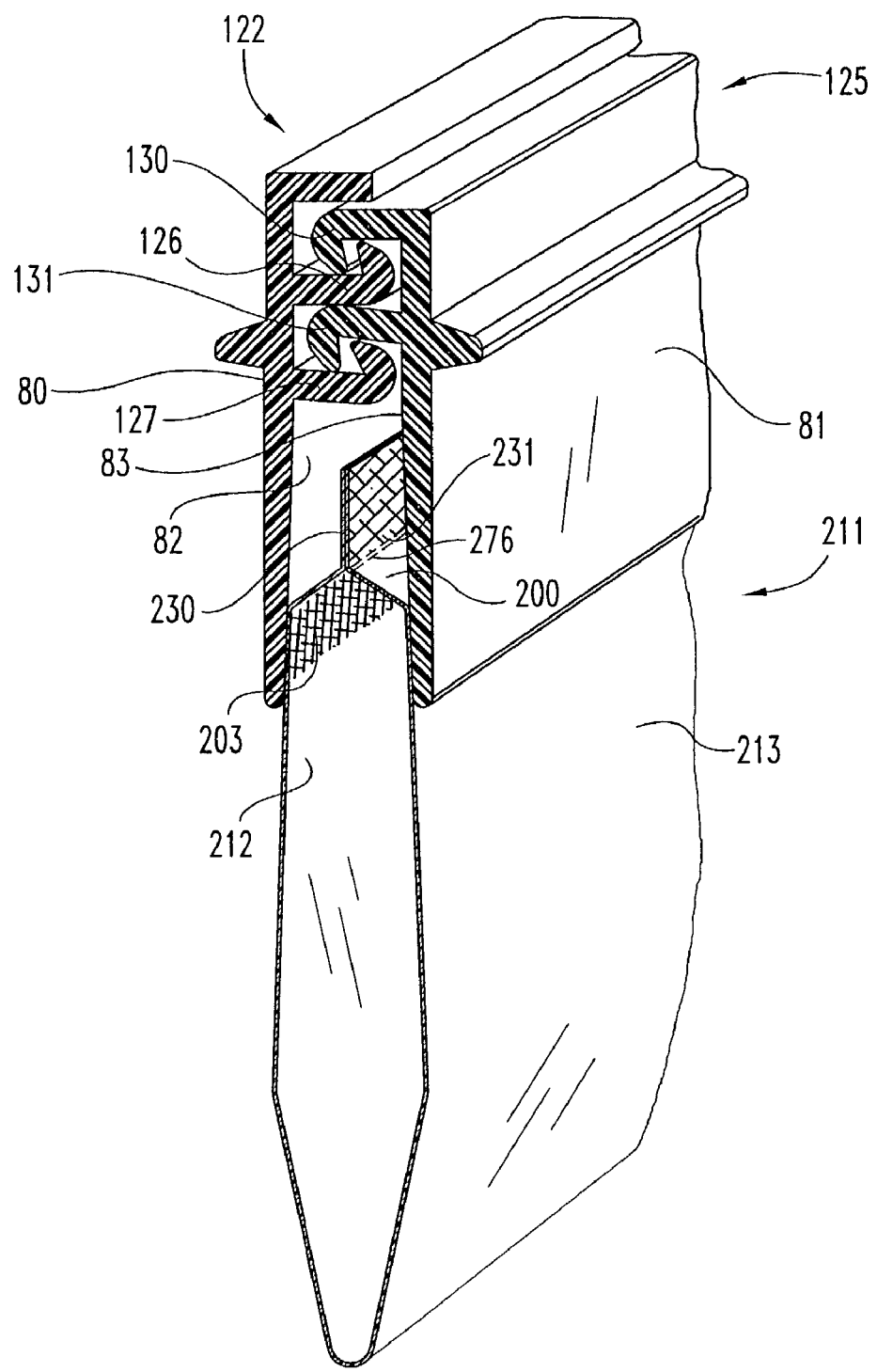
FIG. 15 is a view similar to FIG. 14 of another alternative embodiment of the present invention.

The embodiment shown in FIG. 15 is similar to that shown in FIG. 14 with the exception that the region of side walls 212 and 213 that are secured is more distant from profile element 127 than the region of side walls secured in the embodiment shown in FIG. 14. Specifically, region 203 of side wall 212 is secured to inner face 82 of flexible plastic strip 122 and similar region (not shown) of side wall 213 is secured to inner face 83 of flexible plastic strip 125. One other difference in this embodiment compared to that shown in FIG. 14 is that curved region 301 is replaced by a double layer of film joined together and defining a seal 230 that extends along the width of film 200. Seal 230 may involve the two ends of film being secured together or may involve collapsing and sealing curved region 301 in FIG. 14. Furthermore, it can be seen that film 200 extends along planes oblique to a plane passing between inner face 82 and outer face 80 of flexible plastic strip 122 and a plane passing between inner face 83 and outer face 81 of flexible plastic strip 125.

As in the embodiment shown in FIG. 12, base 231 of seal 230 may be weakened as a result of formation of the seal and may allow one to grasp and tear the seal to open bag 211. Alternatively, a plurality of perforations 276 may be placed along base 231 of seal 230 to aid in rupturing the film. Film 200 may also be ruptured by cutting.

Figure 16:
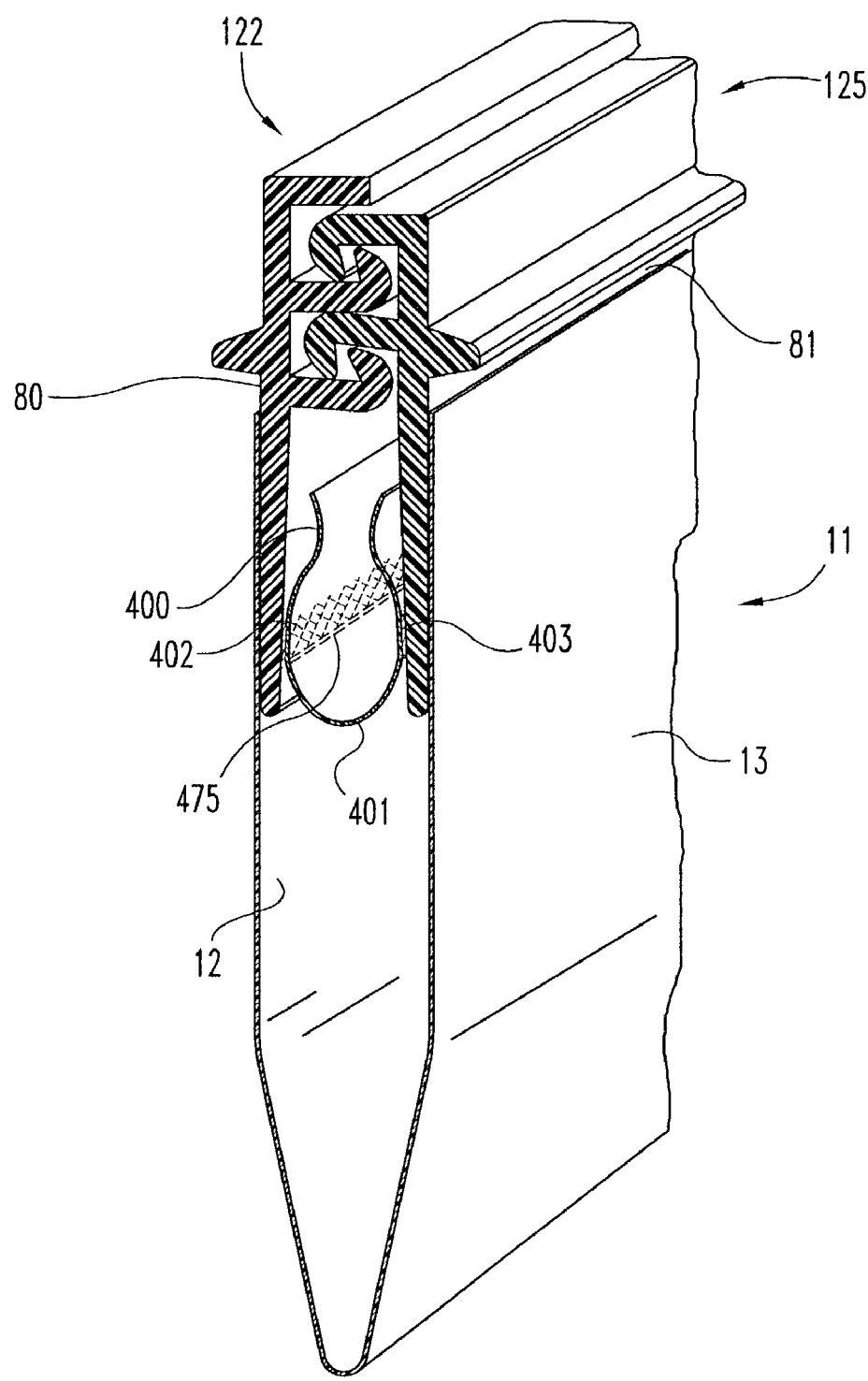
FIG. 16 is a view similar to FIG. 15 of a further alternative embodiment of the present invention.

FIG. 16 depicts a plastic film bag wherein side wall 12 is secured to outer face 80 of flexible plastic strip 122 and side wall 13 is secured to outer face 81 of flexible plastic strip 125. A sheet of plastic film 400 is disposed between side walls 12 and 13 and, in this embodiment, is also disposed between the pair of flexible plastic strips 122 and 125. Film 400 preferably has at least one curved region 401 and is typically secured to the pair of flexible plastic strips 122 and 125 by adhesive strips 402 and 403, respectively. However, film 400 may be secured to the pair of flexible plastic strips by other methods known in the art, including heat sealing.

As discussed when describing the other embodiments, film 400 may have a plurality of perforations 475 for facilitating its rupture or may simply be cut through. Alternatively, depending on the strength of the adhesive used, film 400 may be manually removed for entry into the bag.

It is to be noted that the sheet of flexible plastic film disposed between the side walls can have regions other than curved regions, including pleats and other forms of folds that will act as a gusset.

Figure 17:
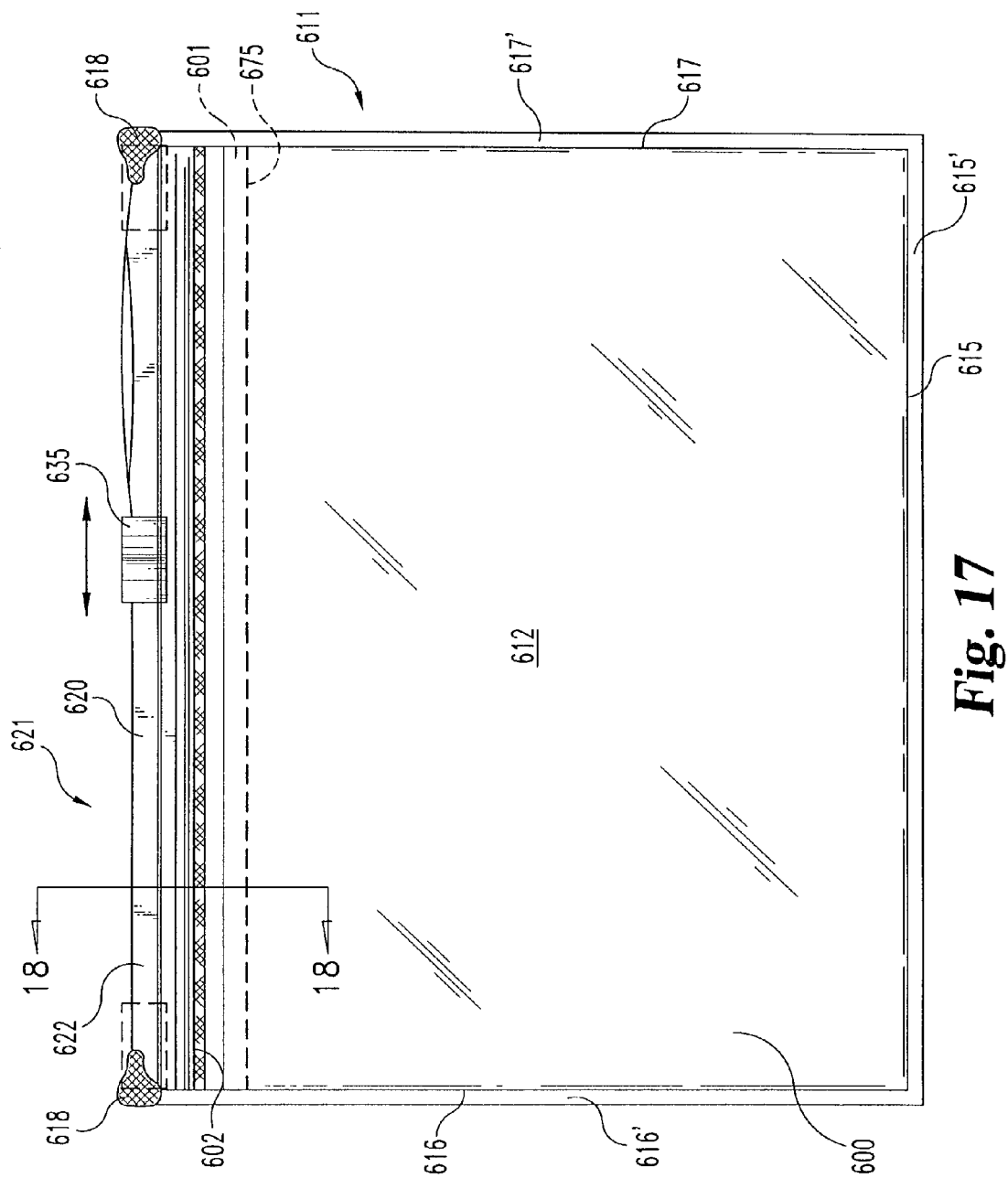
FIG. 17 is a front elevational view of a reclosable flexible bag including a tamper evident zipper slider according to one embodiment of the present invention.
Figure 18:
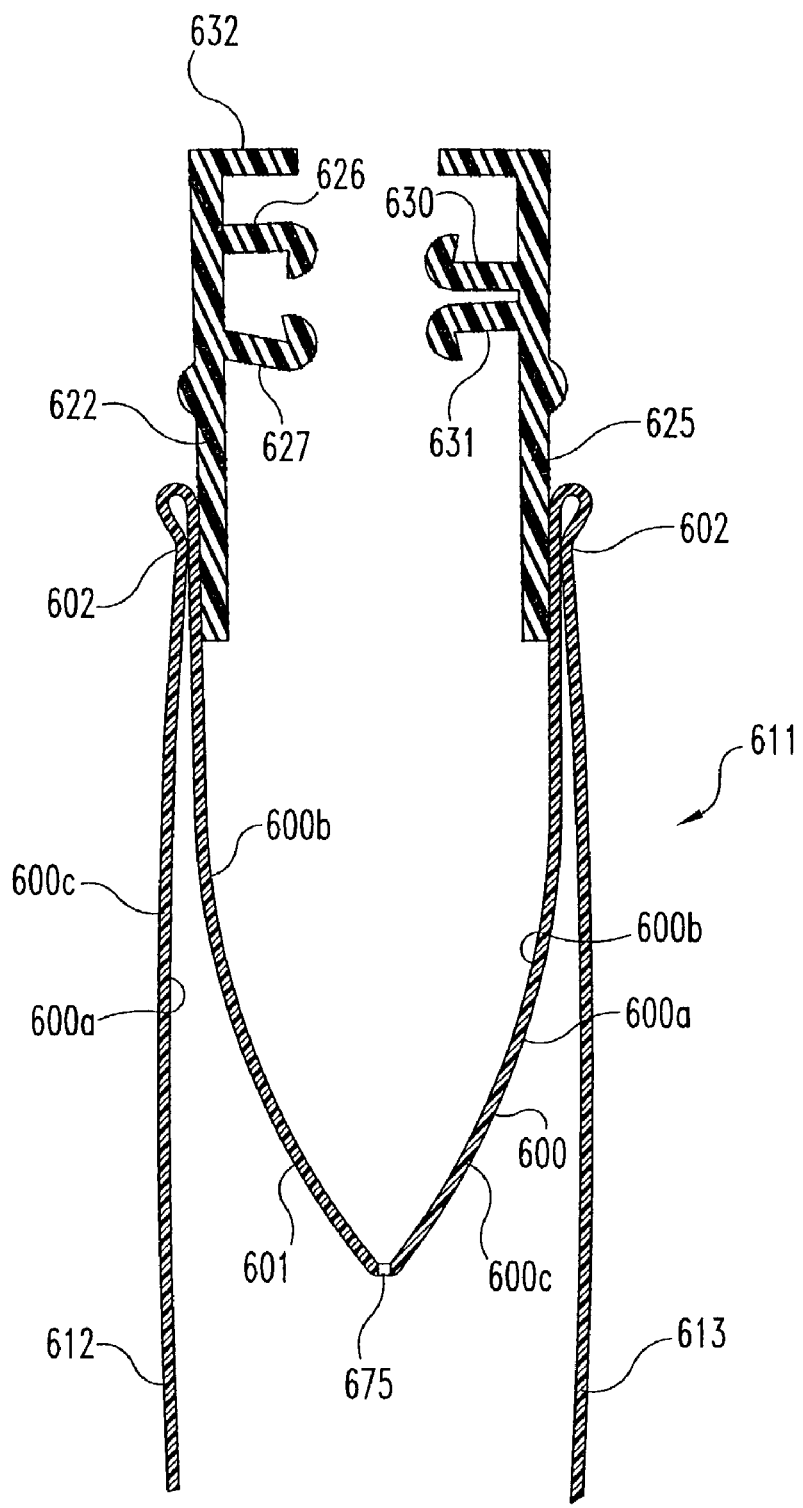
FIG. 18 is a cross sectional view of the reclosable bag of FIG. 17 as taken along line 18-18 of FIG. 17.

FIGS. 17 and 18 illustrate side elevational and cross sectional views, respectively, of a flexible, reclosable bag 611 according to another embodiment of the present invention. The use of an "N" hundred series prefix (NXX) with an element number (XX) refers to an element that is the same as the non-prefixed element (XX) previously described or depicted, except for the differences which are described or depicted hereafter.

Container 611 includes a sheet 600 of flexible plastic film with side edges 616 and 617 and bottom 615. A reclosable fastener 621 extends across a mouth 620 at the top of bag 611. Reclosable fastener 621 includes a pair of flexible plastic strips 622 and 625 which are secured at their ends to sides 616 and 617 by a pair of fused endstops 618. Each side 616 and 617 includes a fused border 616' and 617', respectively, which extend from the bottom of bag 615 to endstops 618. A fused zone 615' extends along the bottom edge 615 of bag 11, and fuses together the loose ends of side walls 612 and 613.

A slider 635 is slidably coupled to fastener strips 622 and 625, slider 635 being adapted and configured to close and open the fastener strips of mouth 621. As best seen in FIG. 18, fastener strip 622 includes a pair of inwardly pointing profile elements 626 and 627. Fastener strip 625 includes a more closely spaced pair of outwardly pointing profile elements 630 and 631. Sliding movement of slider 635 in a closing direction engages profile elements 630 and 631 between profile elements 626 and 627 to close bag 611.

Referring to FIG. 18, side walls 612 and 613 extend upward from bottom 615 toward the outer surfaces of fastener strips 622 and 625, respectively. Each side wall folds over itself and forms a curved region 601 beneath and between fastener strips 622 and 625. Side walls 612 and 613 are fused to respective fastener strips 622 and 625 in a fused zone 602 that extends lengthwise along bag 611. Curved region 601 includes a tear line 675 that extends across the length of bag 611, curved region 601 acting as a tamper evident seal. Tear line 675 can include a series of perforations, or for those embodiments in which hermeticity is required, it can include a line of weakening which does not perforate completely through the thickness of sheet 600.

In order to gain access to the contents of bag 611, the user separates the mouth of the bag, moves slider 635 to unlock the fastener strips, and tears through line of weakening 675 of curved region 601. Curved region 601 separates along line of weakening 675, allowing easy access to the contents of bag 611. Since curved region 601 extends completely to and is fused with regions 616' and 617', it is possible to achieve a hermetic tamper evident seal that extends from side to side. Opening of the tamper evident seal does not affect the integrity of any bag components that are fused together at regions 616' or 617'.

In some embodiments, sheet 600 comprises a plurality of layers which are simultaneously formed together in a coextrusion process. For example, sheet 600 may be coextruded including an oxygen barrier layer 600c fabricated from a material such as ethylene vinyl alcohol (EVOH) which assists in maintaining hermeticity of the interior of bag 611. Further, film 600 may include an inner layer 600a which adheres well to itself during fusion processes, and another layer 600b which does not adhere well to itself. With this selection of layers, it is possible to create the fused areas 602 such that the folded-over side wall adheres well to itself (between adjacent layers 600a) and also to the material of the fastener strips, but which does not adhere to itself throughout curved region 601 (between adjacent layers 600b).

Tear line 675 may be formed by a variety of methods. For example, tear line 675 may be perforated by heat and/or mechanical means. In a more preferred embodiment, tear line 675 does not include perforations, and instead is a line of weakness which maintains hermeticity without perforations. For example, a line of weakness 675 can be fabricated using a laser which weakens one or more layers of sheet 600 as the laser traverses along its path. In some embodiments, film 600 includes one or more layers chosen to selectively absorb the particular wavelength of energy emitted by the laser, and can also include one or more layers which transmit the laser light without absorption. The absorbing layers are thereby heated more by the laser than the transmitting layers, and are thus weakened by the heating.

Figure 19:
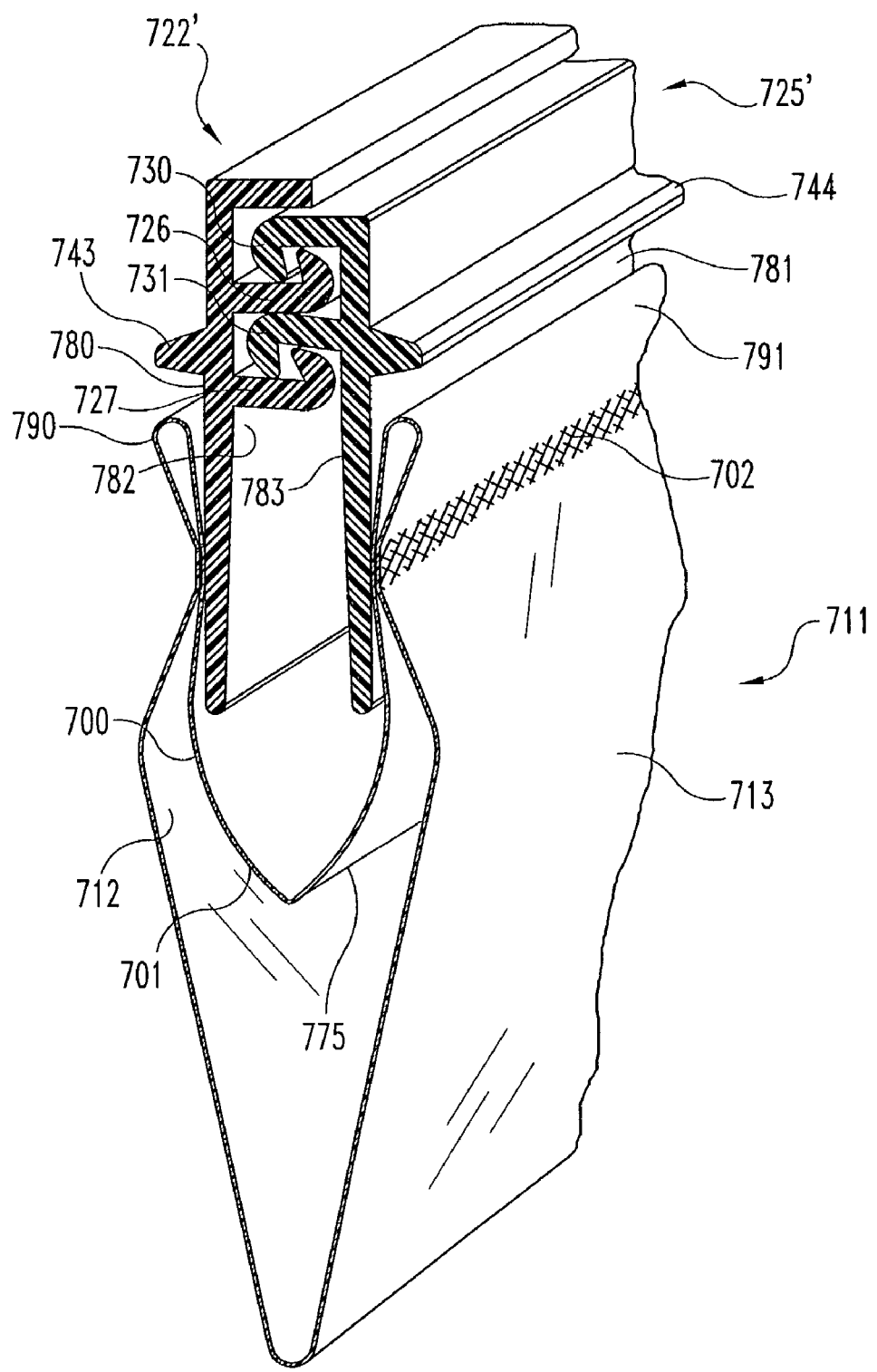
FIG. 19 is a cross sectional, perspective view of a reclosable bag according to another embodiment of the present invention.

FIG. 19 illustrates a cross sectional and perspective view of a bag 711 according to another embodiment of the present invention. Bag 711 is substantially the same as bag 611, except that bag 711 includes fastener strips 722' and 725' which incorporate a different orientation of profile elements 626, 627, 730 and 731. It is understood that the various sheet, bag, and tamper evident seal configurations shown herein can be used with a variety of different reclosable fastener elements. In addition, it is noted that curved area 701 of film 700 can be oriented downward, as shown in FIG. 19, and can also be oriented upward as shown in FIG. 11.

Figure 21B:
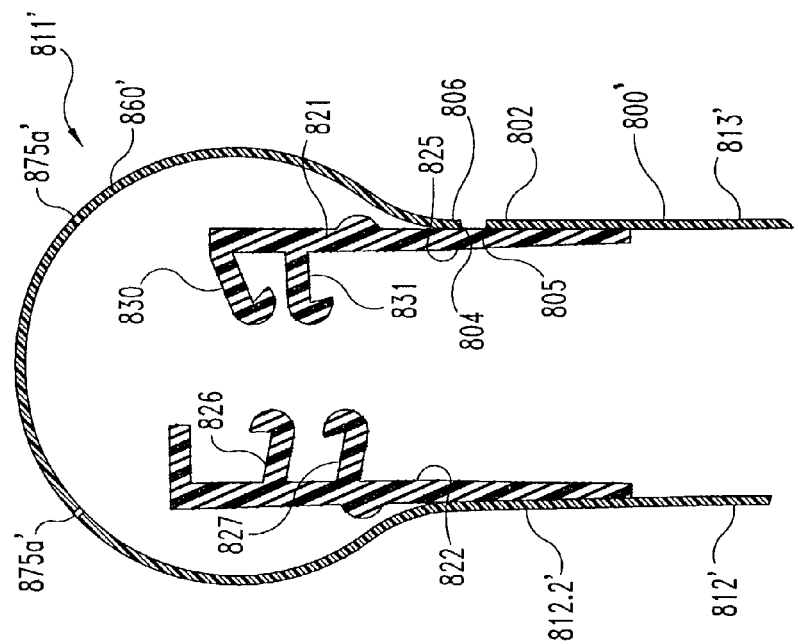
FIG. 21B is a cross sectional view of a reclosable bag according to another embodiment of the present invention.
Figure 21A:
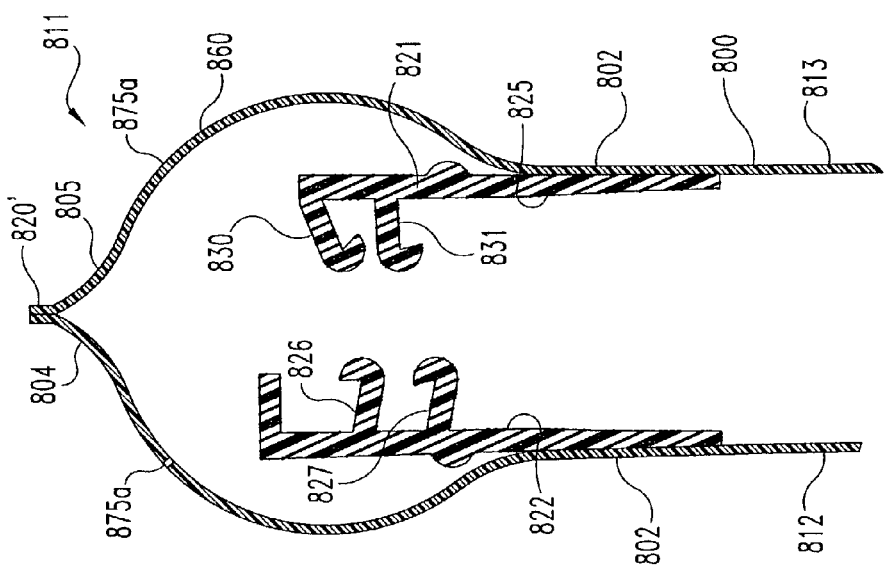
FIG. 21A is a cross sectional view of the reclosable bag of FIG. 20 as taken along line 21-21 of FIG. 20.
Figure 22A:
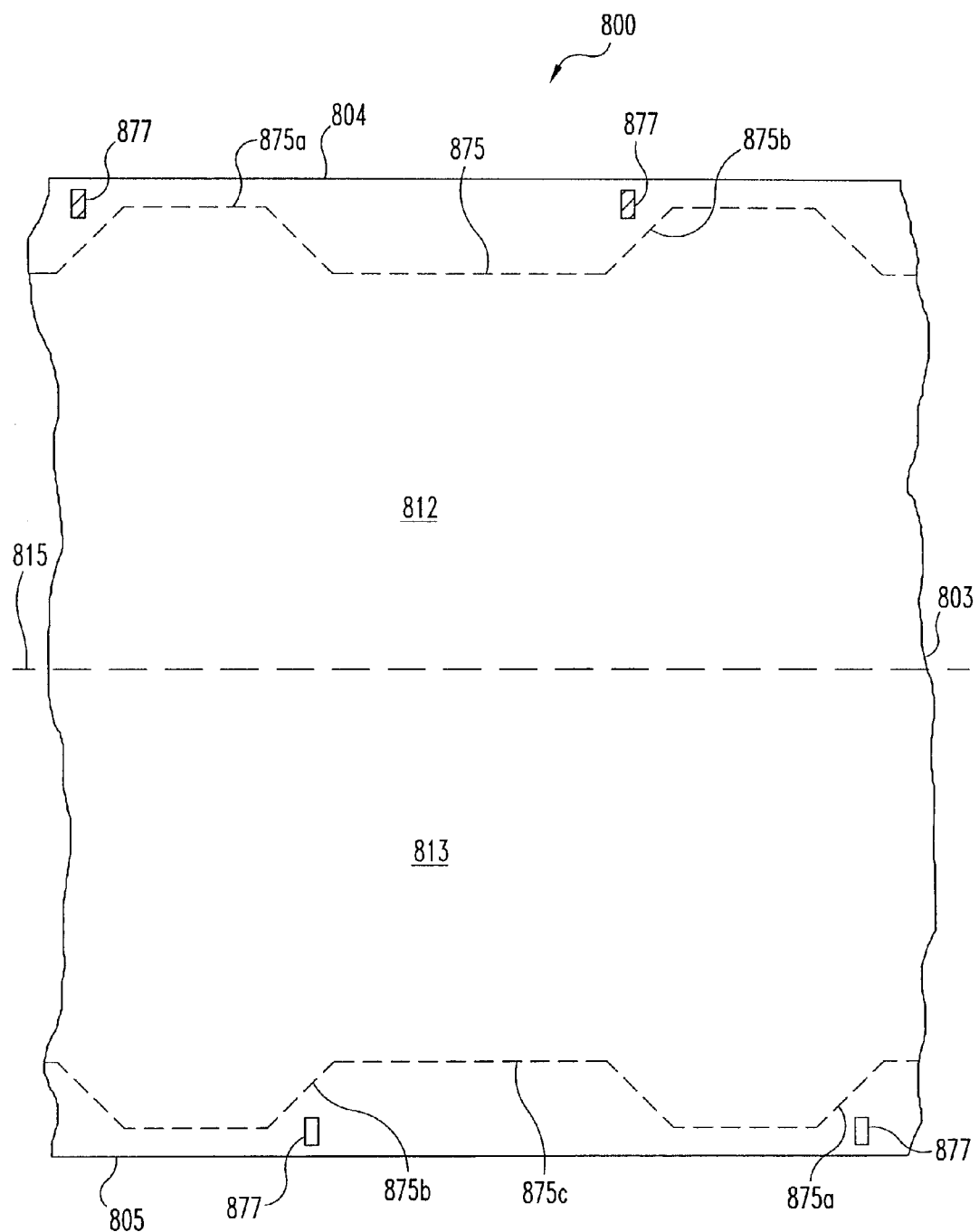
FIG. 22A is a plan, unfolded view of the flexible sheet of the bag of FIG. 21A.

FIGS. 20, 21A, and 22A illustrate various aspects of a flexible, reclosable bag 811 according to another embodiment of the present invention. Container 811 includes a sheet 800 of flexible plastic film with side edges 816 and 817 and folded bottom 815 (not shown). A reclosable fastener 821 extends across a mouth 820 near the top of bag 811. Reclosable fastener 821 includes a pair of flexible plastic strips 822 and 825 which are secured at their ends to sides 816 and 817 by a pair of fused endstops 818. Each side 816 and 817 includes a fused border 816' and 817', respectively, which extend from the bottom of bag 815 to bag mouth 820.

A slider 835 is slidably coupled to fastener strips 822 and 825, slider 835 being adapted and configured to close and open the fastener strips of mouth 821. As best seen in FIG. 21A, fastener strip 822 includes a pair of profile elements 826 and 827 and fastener strip 825 includes a pair of profile elements 830 and 831. Sliding movement of slider 835 in a closing direction engages profile elements 830 and 831 with profile elements 826 and 827 to close bag 811.

Sheet 800 of bag 811 is preferably folded along bottom 815, and includes fused zones 816' and 817' along sides 816 and 817, respectively, extending from bottom 815 toward mouth 820 at the top of container 811. As best seen referring to FIG. 21A, sides 812 and 813 are fused to their respective fastener strips along lengthwise fused zones 802. The open edges of sheet 811 extend upward past the profile elements of the fastener strips 822 and 825, forming a hooded enclosure 860 joined at the top along lengthwise fused zone 820'. Hood 860 extends from fused zone 816' to 817', and preferably completely encloses the slider and fastener strips of bag 811.

Referring to FIG. 20, tear line 875 comprises portions 875a, 875b, and 875c which extend from side to side of the bag, and both above and below the slider and profile elements as will be described. Bag 811 includes a tear line 875a along the length of hood 860. Tear line 875a extends inwardly from each fused zone 816' and 817' at a location between top most fused zone 820' and fused endstops 818. A transition portion 875b of tear line 875 extends from upper portion 875a at an angle downward in hood 860 past the slider and profile elements to a central, lowest portion 875c. Portion 875c extends between the bottom profile element of the fastener strips and fusion zone 802. Tear line 875 is thus a non-linear pattern of weakening, comprising a plurality of linear portions or sections which are not on a single straight path. Although substantially linear portions 875a, 875b, and 875c have been shown and described, the present invention also contemplates those embodiments in which one or more portions or sections of the tear line are curved.

In order to gain access to the contents of bag 811, the user tears off the top part of hood 860. Hood 860 separates along line of weakening 875, allowing easy access to slider 835 and to the contents of bag 811 along the central portion 875c of the ruptured hooded enclosure. By placing line of weakness 875a above endstop 818, it is possible to achieve a hermetic tamper evident seal that extends from side to side. Removal of the top portion of hooded enclosure 860 does not affect the integrity of various bag components that are fused together at endstop 818.

Tear line 875 includes a series of perforations, or for those embodiments in which hermeticity is required, a line of weakening which does not perforate completely through the thickness of sheet 800. Tear line 875 may be formed by a variety of methods, as previously discussed for tear line 675. For example, tear line 875 may be perforated by heat and/or mechanical means. In a more preferred embodiment, tear line 875 is fabricated using a laser which weakens one or more layers of sheet 800 as the laser traverses along its path. Further, film 800 may comprise a plurality of layers which are simultaneously formed together in a coextrusion process, such as that previously described for sheet 600.

In one embodiment, the sheet 800 of bag 811 is fabricated from a continuous sheet 803, which is shown in FIG. 22A. Tear lines 875 are introduced in a preferably repetitive pattern onto continuous sheet 803 and preferably in the unfolded state. Tear lines 875 are preferably located on sheet 800 generally parallel to the edges of the sheet, and spaced apart from the edge of the sheet so as to provide an unscored region along the edge for subsequent attachment to a fastener strip and/or second sheet of film. In one embodiment, each tear line 875 is further equally spaced apart from either the fold line or center line of the sheet of film. In one embodiment, sheet 803 includes a plurality of sensor marks 877. Sensor mark 877 is sensed by a sensor such as an optical pick-up or conductivity probe. The passing of sensor mark 877 past the sensor triggers the movement of the device which creates tear line 875, such as the laser, so that the desired tear-off pattern is produced. After continuous film 803 has been scored or perforated in the appropriate pattern, the continuous film is severed into separate portions 800 at bag-length intervals that are subsequently folded to make the side walls of container 811.

Figure 22B:
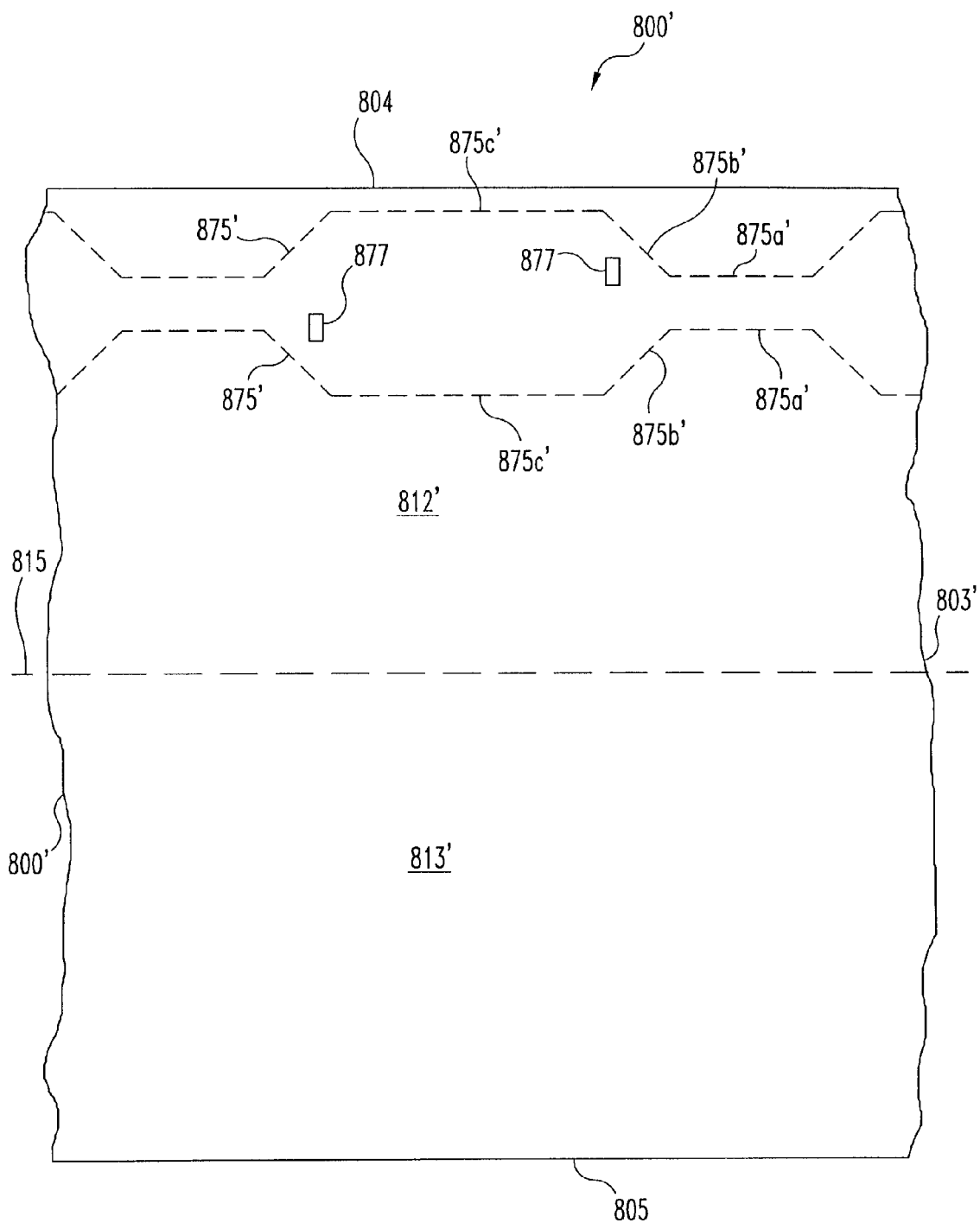
FIG. 22B is a plan, unfolded view of the flexible sheet of the bag of FIG. 21B.

A bag 811' according to another embodiment of the present invention, which is formed from sheet 800', will now be described with reference to FIGS. 21B and 22B. In this embodiment, as illustrated in FIG. 22B, both tear lines 875 are formed on side 812' of the sheet 800', and no tear lines 875 are formed on side 813' of the sheet 800'. The sheet 800' is folded along fold line 815 and attached to fastener strips 822 and 825 to form bag 811'. Referring to FIG. 21B, edge 805 of side 813' of the sheet 800' is sealed to fastener strip 825 at fused zone 802. Side 812' of the sheet 800' is sealed to fastener strip 822 at fused zone 812.2'. Side 812' of the sheet 800' is folded over to form a hood 860', and due to the folding, both tear lines 875 are substantially aligned with and opposite to one another. Edge 804 of the sheet is attached to fastener strip 825 at fused zone 806, thereby forming the closed bag 811'. The user gains access to bag 811' by tearing the upper half of the hood 860' along the tear lines 875.

Figure 33:
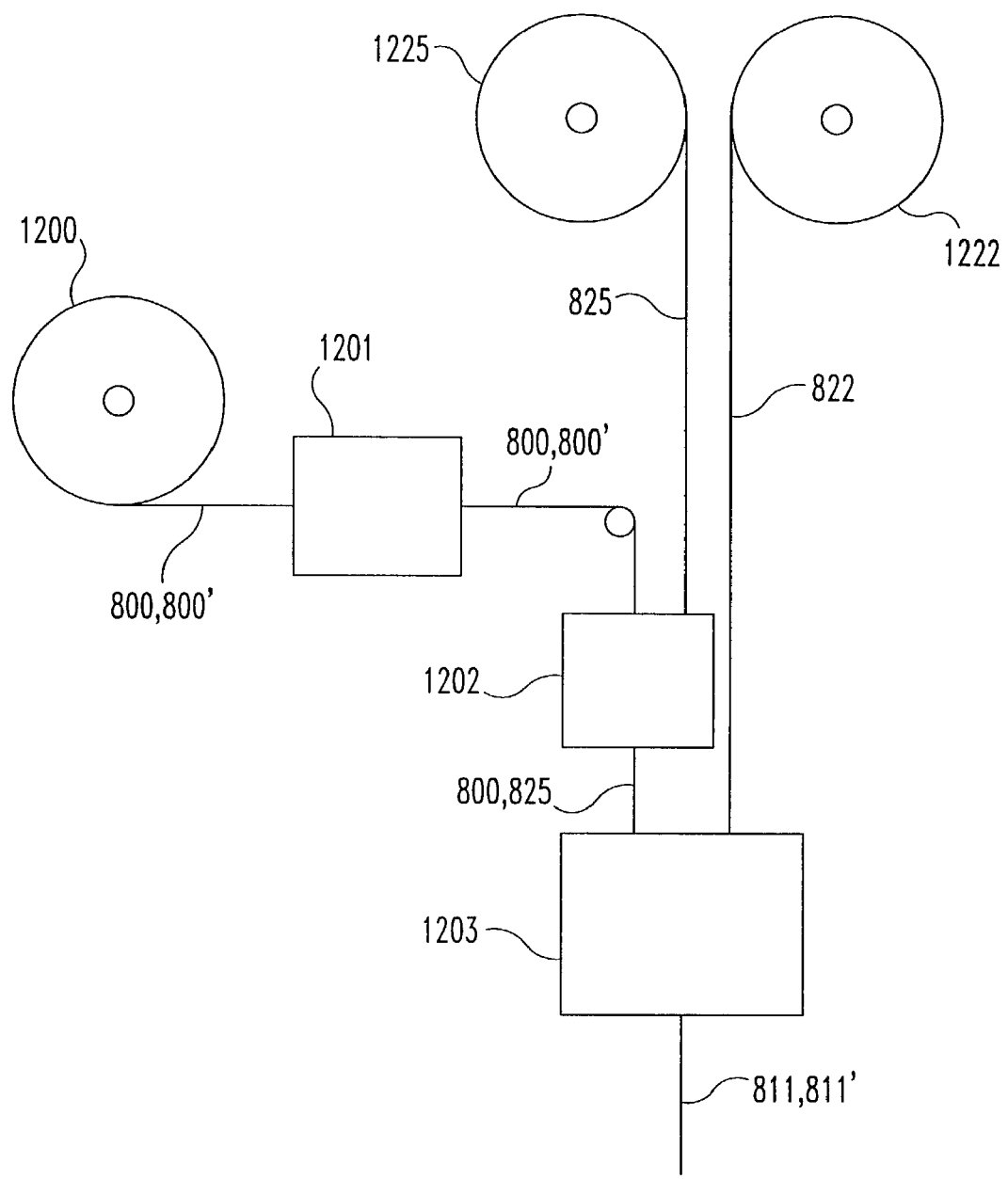
FIG. 33 is a schematic process diagram illustrating techniques for manufacturing reclosable bags according to other embodiments of the present invention.

Techniques for forming bags 811 and 811' will now be described with reference to FIG. 33. In the illustrated embodiment, fastener strips 822 and 825 are supplied on rolls 1222 and 1225, respectively. In another embodiment, fastener strips 822 and 825 are supplied together on a single roll. As should be appreciated, fastener strips 822 and 825 can be supplied in other manners as would be contemplated by those skilled in the art.

In the technique for manufacturing the bag 811 illustrated FIGS. 20, 21A and 22A, sheet 800 is supplied from roll 1200. In station 1201, the tear lines 875 are formed on the sheet 800 in the pattern as illustrated in FIG. 22B. Following station 1201, the now scored sheet 800 in station 1202 is attached to fastener strip 825 and folded to form the bottom 815 of the bag 811 in the manner as described above. In station 1203, the sheet 800 is then attached to fastener strip 822 and the edges 804, 805 are sealed together at zone 820' to form the closed bag 811. It should be understood that stations 1201, 1202 and/or 1203 can be combined together, and also that some details of the process (welding stations, guiding rollers, etc.) have not been shown for sake of clarity. In another embodiment, the scoring of the sheet in station 1201 occurs after the sheet 800 is attached to fastener strips 822 and 825 in stations 1202 and 1203.

In the technique for manufacturing the bag 811' illustrated FIGS. 21B and 22B, sheet 800' is supplied from roll 1200. In station 1201, the sheet 800' is scored to form tear lines 875' in the pattern as illustrated in FIG. 22B and as described above. After tear lines 875' are formed in the sheet 800', edge 805 of sheet 800' is sealed to fastener strip 825 at fused zone 802 in station 1202. Sheet 800' is then folded to form the bottom 815 of the bag 811'. In station 1203, side 812' of the sheet 800' is sealed to fastener strip 822 at fused zone 812.2'. Side 812' of the sheet 800' is folded over to form a hood 860' such that the tear lines 875 are substantially aligned with one another. Edge 804 of the sheet is attached to fastener strip 825 at fused zone 806, thereby forming the closed bag 811'. It should be appreciated that stations 1201, 1202 an/or 1203 can be combined together. In another embodiment, the scoring in station 1201 occurs after the bag is formed in stations 1202 and 1203. In some embodiments of the present invention, a slider is attached to the fastener profiles at any point in the process where the fastener strips are generally interlocked together.

In the embodiments described below, a hermetically sealed, tamper evident fastener tape is created such that the fastener tape can be supplied to customers who do not have the systems in place to produce hermetically sealed score lines. The fastener tape according to the present invention allows customers to create hermetically sealed tamper evident bags without incurring the cost of expensive equipment, such as laser scoring equipment. The tape can be made for use with gusseted slider bags as disclosed above and/or with other types of hermetically sealed packaging that need tamper evident reclosable fasteners. The tape includes a film layer that is pre-scored and applied to the zipper on both flanges. This tape can be rolled onto a spool and shipped to the customer for use in their facilities. In one embodiment, once the customer receives the fastener tape, the customer is able to seal standard film to the tape and apply a slider to the finished package. In one form of the present invention, to use the package, the consumer opens the zipper with the slider. Upon first entry into the bag, the customer breaks an inner, laser scored membrane by pulling the two sides of the zipper apart. After the membrane is broken the first time, it cannot be resealed. In another form of the present invention, the laser scored tear line is formed on an outside hood of the package. The consumer must first tear the package along the laser scored line in order to gain access to the package. Although laser scoring has been shown and described, the present invention contemplates mechanical methods of scoring, including puncturing methods of scoring.

Figure 23:
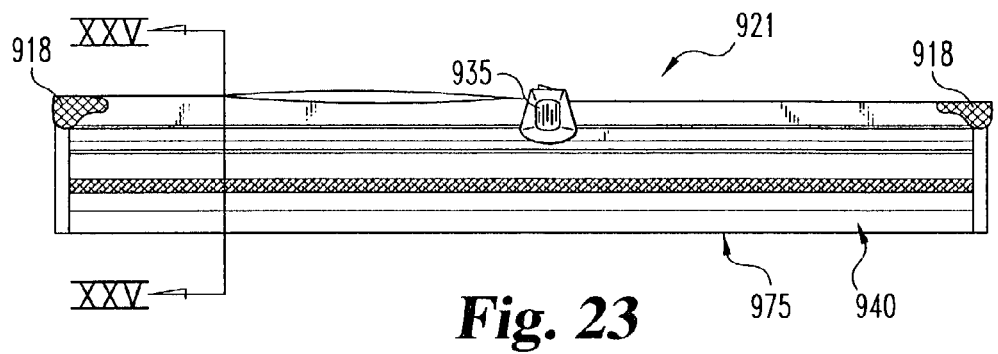
FIG. 23 is front elevational view of a hermetically sealed, reclosable fastener tape according to another embodiment of the present invention.
Figure 24:
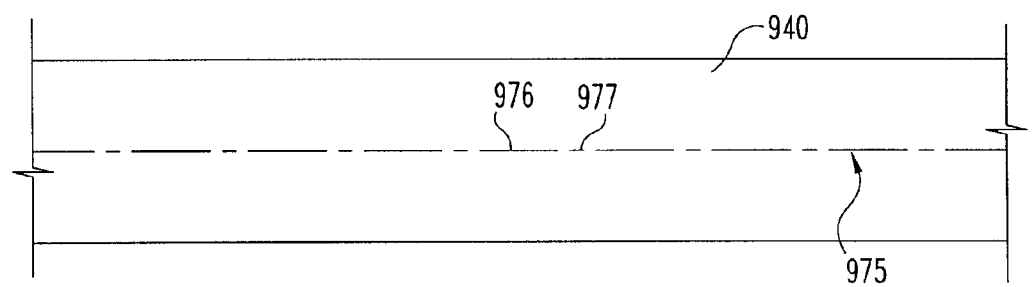
FIG. 24 is a plan, unfolded view of a flexible sheet used in the FIG. 23 fastener tape.
Figure 25:
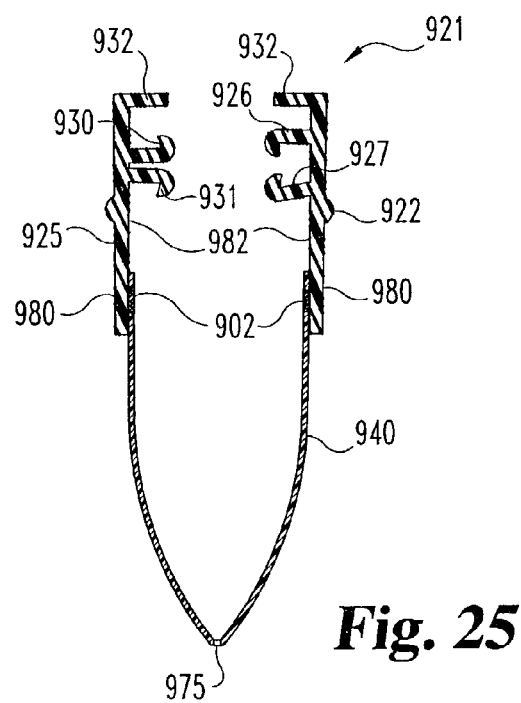
FIG. 25 is a cross sectional view of the FIG. 23 fastener tape as taken along line XXV-XXV of FIG. 23.

A reclosable fastener tape 921 according to one embodiment of the present invention is illustrated in FIGS. 23-25. As shown in FIG. 25, the fastener tape 921 includes a pair of fastener strips 922. Fastener strips 922 and 925 are designed to mate with one another in a reclosable fashion. As illustrated, fastener strip 922 includes a pair of inwardly pointing profile elements 926 and 927. Similarly, flexible fastener strip 925 includes a pair of outwardly pointing profile elements 930 and 931. The outwardly pointing profile elements 930 and 931 are configured to be received between and lock with the inwardly pointing profile elements 926 and 927 in order to form a reclosable seal. Both strips 922 and 925 include upper sealing members or flanges 932, which provide a clean appearance when elements 926, 927, 930 and 931 are interlocked with one another. As should be appreciated, other types of mating profiles can be used to form the reclosable seal.

Figure 9:
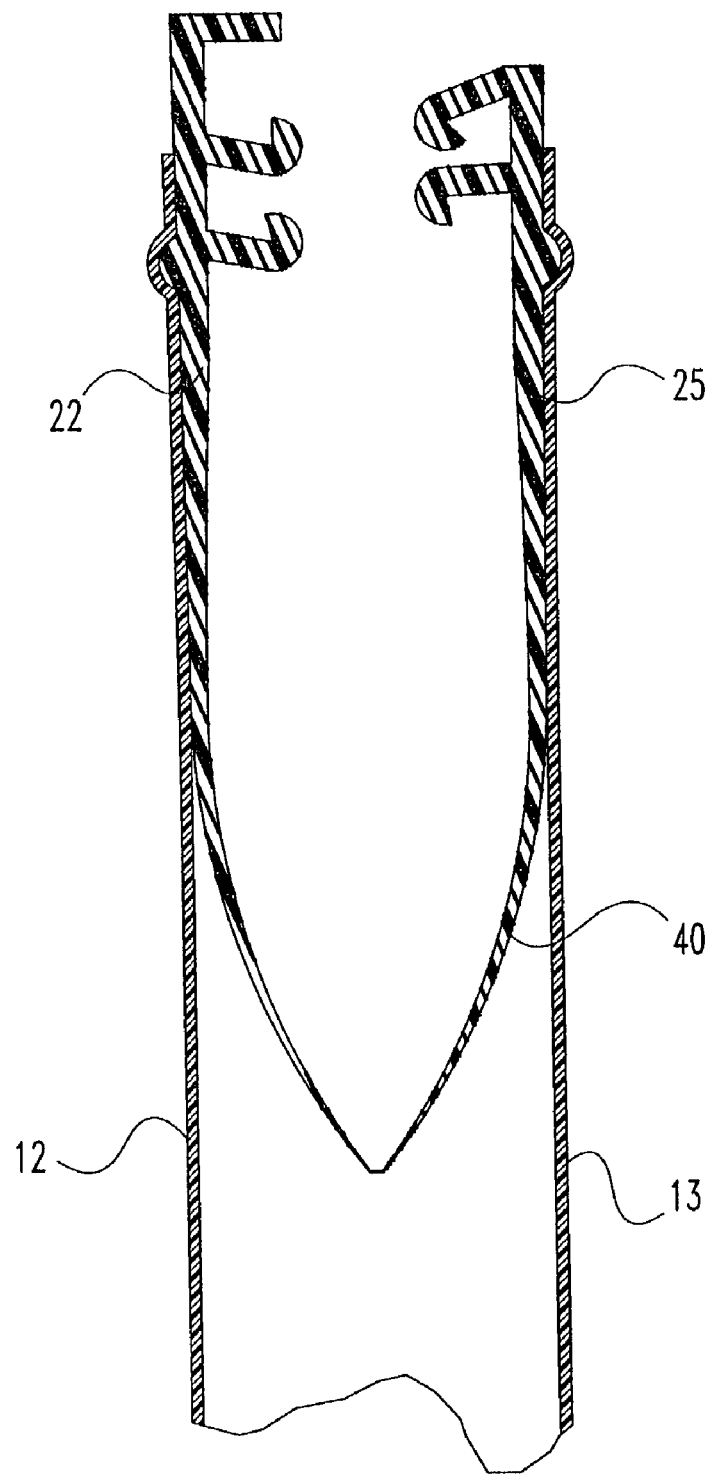
FIG. 9 is an enlarged fragmentary view similar to FIG. 8.
Figure 9A:
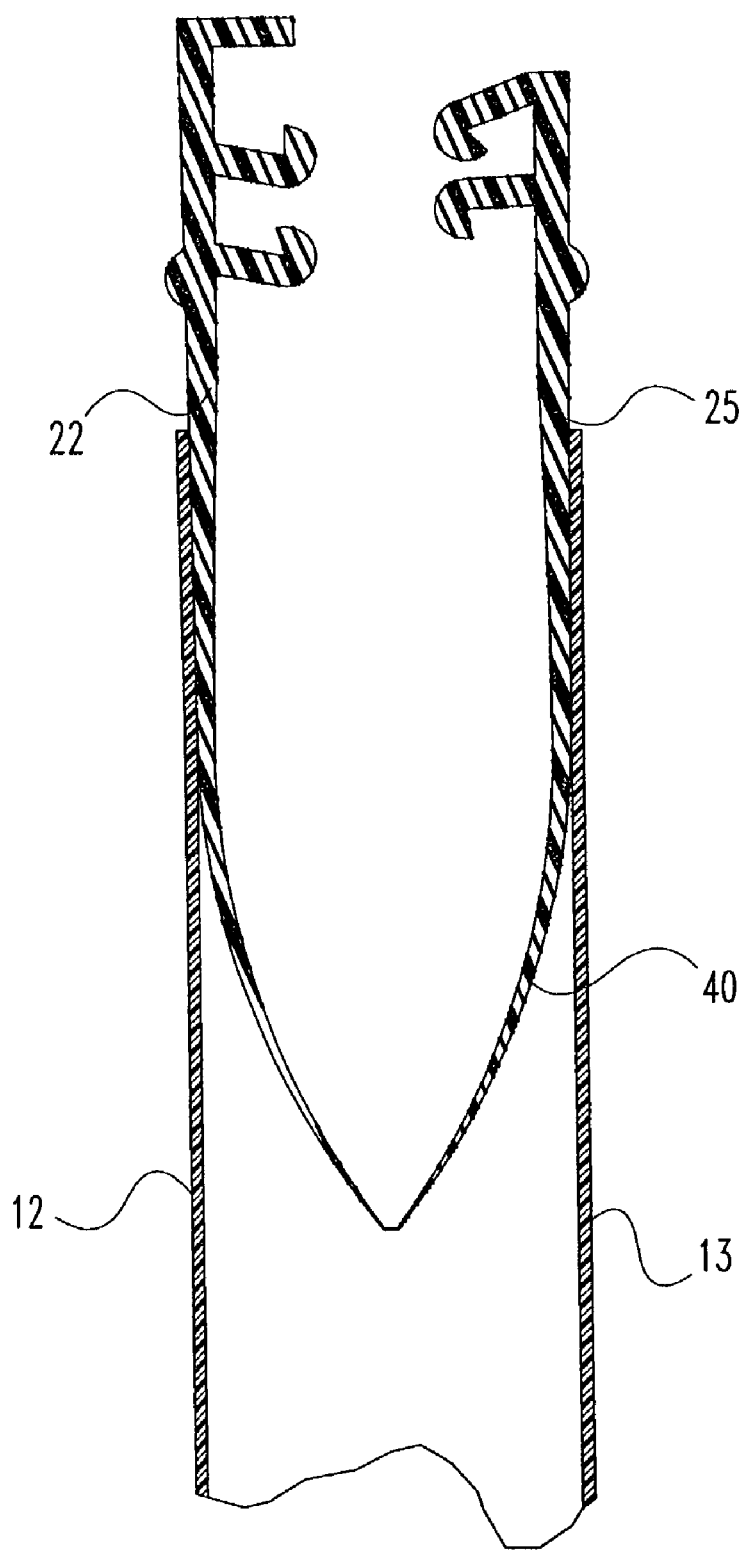
FIG. 9A is an enlarged fragmentary view similar to FIG. 8A.

As shown in FIG. 23, fastener strips 922 and 925 are joined to one another through a sheet or membrane 940. In one form of the present invention, sheet 940 is formed from a sheet of flexible plastic that extends below fastener strips 922 and 925. Sheet 940 can be attached to the fastener strips 922 and 925 in manners as generally know to those skilled in the art, such as through heat sealing and/or through adhesives, to name a few. In the embodiment illustrated in FIG. 23, sheet 940 is attached to inner faces 982 of the fastener strips 922 and 925 at regions 902. As should be appreciated, sheet 940 in other embodiments can be attached to outer faces 980 of the fastener strips 922 and 925 (FIG. 27), or sheet 940 can be integrally formed with the fastener strips 922 and 925 (FIG. 9).

Referring to FIG. 24, in one embodiment, a line of weakness or tear line 975 is formed on sheet 940, when in an unfolded state. In order to provide a hermetic seal, sheet 940 is not punctured along the tear line 975, but rather, sheet 940 is weakened along the tear line 975. Sheet 940 along the tear line 975 can be weakened using a number techniques. For instance, the tear line 975 in the illustrated embodiment is thermally weakened by laser scoring. With laser scoring, the tear line 975 is fabricated using a laser, which weakens one or more layers of sheet 940 as the laser traverses along the path for the tear line 975. In one form, sheet 940 includes one or more layers chosen to selectively absorb the particular wavelength of energy emitted by the laser, and also includes one or more layers which transmit the laser light without absorption. The absorbing layers are thereby heated more by the laser than the transmitting layers, and are thus weakened by the heating.

Tear line 975 is able to provide a visual cue of whether or not the hermetic seal has been broken for a package that incorporates the fastener tape 921 according to the present invention. For added security, the tear line 925 in the illustrated embodiment incorporates an audible cue of whether the seal has been broken. The depth and/or length of individual scores of the scoring pattern are intermittently increased and decreased along the tear line 975 so that a "zipping" sound is created as the tear line 975 is initially torn open. As depicted in FIG. 24, the tear line 975 preferably has high 976 and low 977 score line areas at which the scoring depth is increased and decreased, respectively. The high score line area 976 has a scoring depth that is greater than the scoring depth of the low score line area 977. In another embodiment of the present invention, the length of score line areas 976 and 977 can differ from one another. For example, in the illustrated embodiment, the high score line area 976 has a length that is longer than the length of the low score line area 977. This scoring pattern can be created through a number of techniques. Using the laser scoring technique, this scoring pattern is created by intermittently increasing and decreasing the intensity of the laser as the laser scores the tear line 975 along sheet 940.

As mentioned above, the fastener tape 921 according to one embodiment of the present invention is supplied to customers that do not have the capability or equipment to form hermetically sealed tear lines for tamper evident reclosable packaging. The fastener tape 921 of the present invention can be supplied to the customers in a number of forms. In one form, the fastener tape 921 is formed as a continuous strip that is rolled around a roll, which is then supplied to the customer, with or without a preapplied slider. In another form, as illustrated in FIG. 23, the fastener tape 921 is sold as discrete units with a slider 935 already installed on the fastener tape 921. In one embodiment, ends of the fastener tape are sealed to one another at fused end stops 918 that are formed along the fastener strips 922 and 925.

Figure 26:
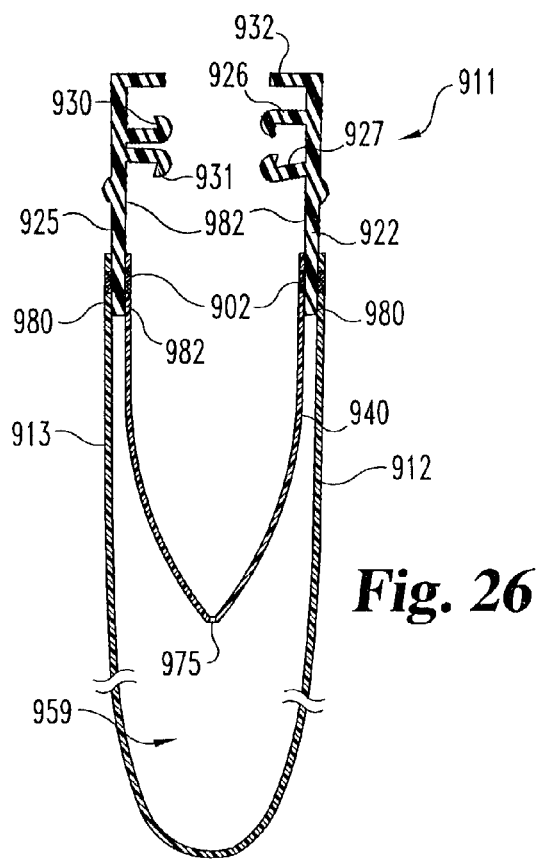
FIG. 26 a cross sectional view of the FIG. 23 fastener tape attached to the side walls of a bag.

Referring to FIG. 26, once the fastener tape 921 is received, the customer is able to attach side walls 912 and 913 to the outer faces 980 of the fastener strips 922 and 925, thereby forming a hermetically sealed bag 911. Sheet 940 and the sidewalls 912, 915 form a hermetically sealed cavity 959 in which items, such as perishables, can be stored. A person gains access to the items stored in cavity 959 by tearing open sheet 940 along tear line 975.

Figure 27:
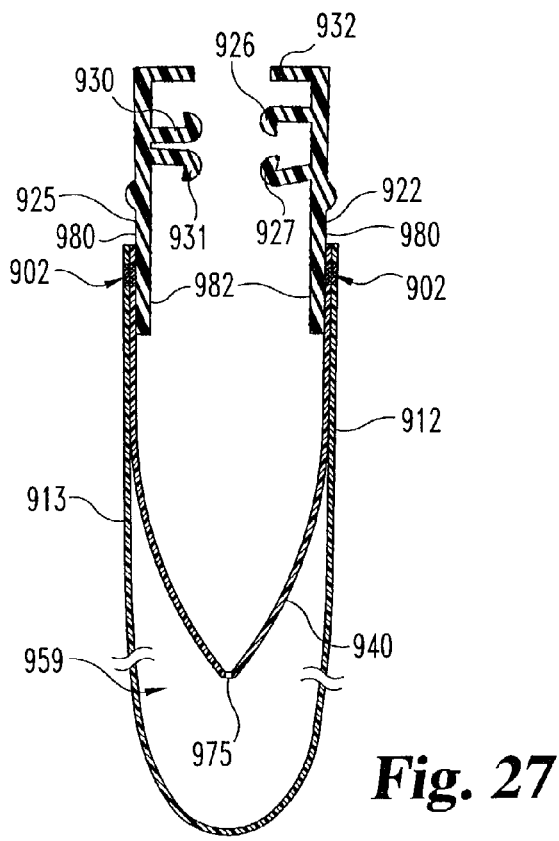
FIG. 27 is a cross sectional view of a reclosable bag incorporating a hermetically sealed, tamper evident fastener tape according to another embodiment of the present invention.

In the embodiment illustrated in FIG. 27, sheet 940 is attached to the outer faces 980 of the fastener strips 922 and 925. To create a hermetically sealed package, the customer attaches the sidewalls 912 and 913 to sheet 940 such that the sidewalls 912 and 913 span across the tear line 975. As shown, the sidewalls 912 and 913 are attached proximal to regions 902. However, it should be appreciated that the sidewalls 912 and 913 can be attached at other locations, such as being directly attached to the fastener strips 922 and 925.

Figure 28:
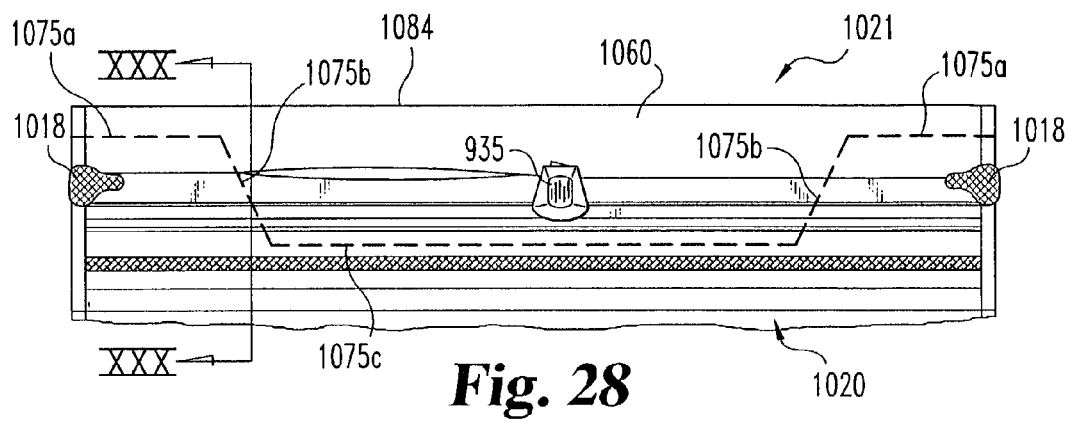
FIG. 28 is a front elevational view of a hermetically sealed, tamper evident fastener tape according to another embodiment of the present invention.
Figure 29:
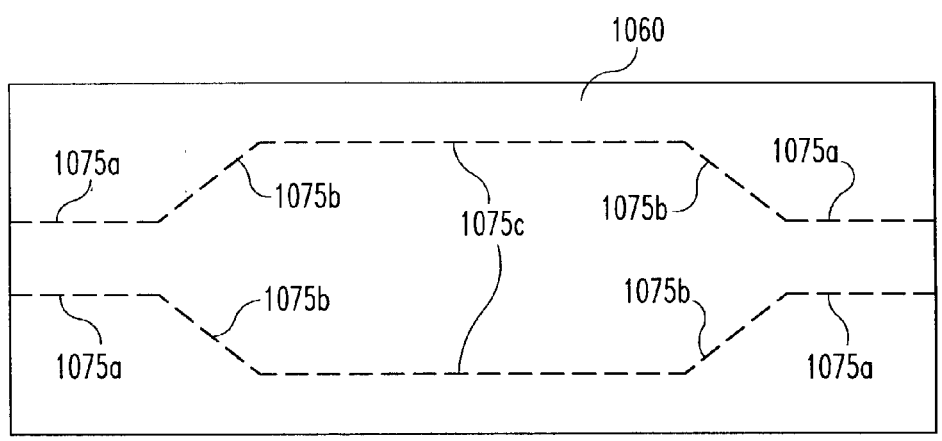
FIG. 29 is a plan, unfolded view of the flexible sheet incorporated in the FIG. 28 fastener tape.
Figure 30:
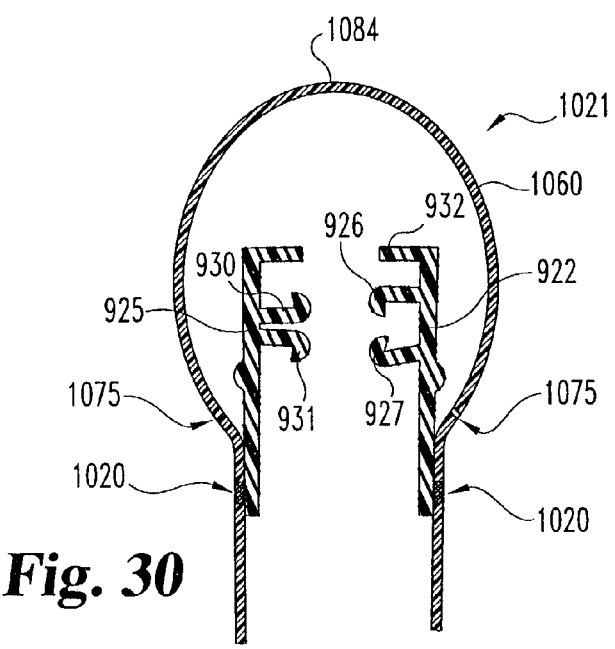
FIG. 30 is a cross sectional view of the FIG. 28 fastener tape as taken along line XXX-XXX of FIG. 28.

A reclosable fastener tape 1021 according to another embodiment of the present invention is illustrated in FIGS. 28-30. As illustrated in FIG. 30, the fastener tape 1021 includes a pair of fastener strips 922 and 925 that are adapted to mate with one another in a resealable fashion. A hood or sheet 1060 is connected to the outer faces 980 of the fastener strips 922 and 925 at connection regions 1020. In the illustrated embodiment, the hood 1060 spans around fastener strips 922 and 925. In yet other embodiments of the present invention, sheet 1060 is connected by thermal fusion to a single face 980 of one of the fastener strips 922 or 925. This assembly of fastener strips and partially attached sheet 1060 can be provided for processing in a subsequent operation that attaches a second sheet of flexible film for the bag side walls, and also in which the free end of sheet 1060 is attached to the outer face 980 of the other fastener strip.

Referring to FIGS. 28-29, the hood 1060 has preferably unpunctured tear lines or areas of weakening 1075 in order to provide a tamper evident hermetic seal when the fastener tape 1021 is incorporated into a package. In one form of the present invention, the tear lines 1075 are formed through laser scoring. As depicted in FIG. 29, tear lines 1075 are formed on continuous sheet 1060, preferably with sheet 1060 in an unfolded state. As shown, each tear line 1075 include portions 1075a, 1075b, and 1075c which extend from side to side along the fastener tape 1021, both above and below the slider and profile elements as will be described. At portions 1075a, the tear line 1075 extends between closed or folded end 1084 of the hood 1060 and the profile elements of the fastener strips 922 and 925, as is shown in FIG. 28. Transition portions 1075b of the tear line 1075 extend from portions 1075a at an angle past the profile elements to portion 1075c. Portion 1075c extends between profile elements 927 and 931 of the fastener strips and connection region 1020. In the manner as discussed above, sheet 1060 can be formed with sensor marks that direct the position of the laser along tear line 1075 in order to produce the desired tear-off pattern.

Figure 31:
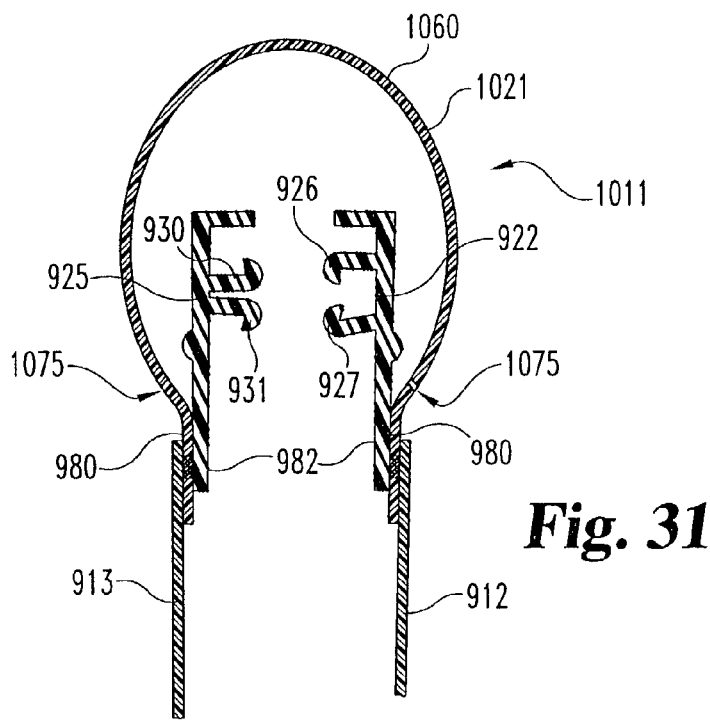
FIG. 31 is a cross sectional view of a reclosable bag incorporating the FIG. 28 fastener tape.

In one form of the present invention, the fastener tape 1021 is formed as a continuous strip, which is wrapped around a roll or folded and sold to customers that produce hermetically sealed bags. In the FIG. 28 embodiment, the fastener tape 1021 is formed as a discrete component that is sold to the customer. As illustrated, the fastener tape 1021 includes sealed end stops 1018 along with slider 935, which is used to open and seal the fastener strips 922 and 925. At the customer's facility, side walls 912 and 913 can be attached to opposite ends of the hood so as to form a hermetically sealed bag 1011 (refer to FIG. 31). In those embodiments in which the hood 1060 has not been completely attached to the outer faces of both fastener strips, the customer can slide the slider 935 onto one end of the fastener strips 922 and 925 before sealing the bag 1011.

In order to gain access to the contents of bag 1011, the user tears off the top part of hood 1060. Hood 1060 separates along tear line 1075, allowing easy access to slider 935 and to the contents of bag 1011 along portion 1075c of the ruptured hooded enclosure. By placing portions 1075a of the tear line 1075 above end stops 1018, it is possible to achieve a hermetic tamper evident seal that extends from side to side. Removal of the top portion of hood 1060 does not affect the integrity of various bag components that are fused together at end stops 1018.

Figure 32:
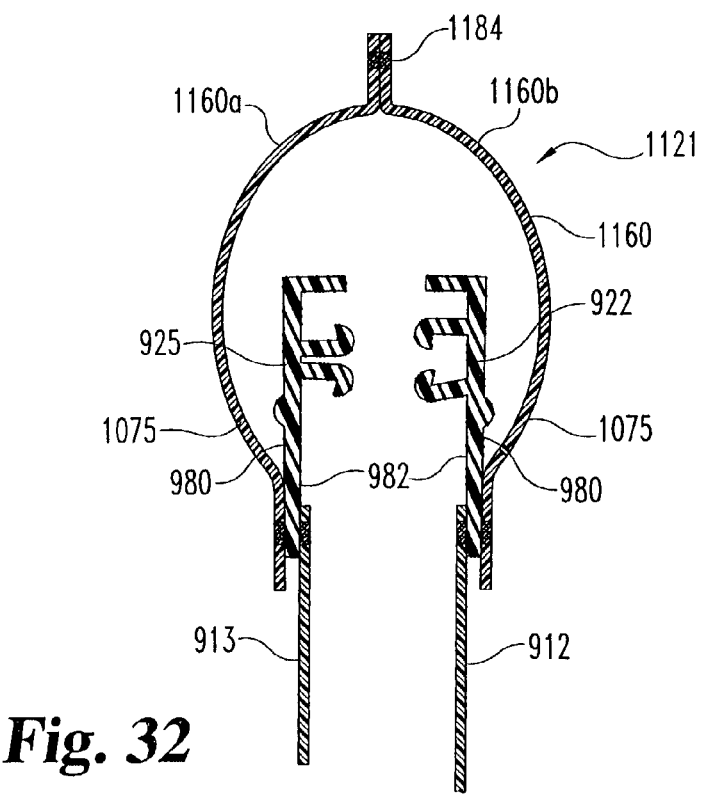
FIG. 32 is a cross sectional view of a reclosable bag incorporating a hermetically sealed, tamper evident fastener tape according to further embodiment of the present invention.

A fastener tape 1121 according to another embodiment of the present invention is illustrated in FIG. 32. In this embodiment, hood 1160 is formed from two separate sheets 1160a and 1160b that are joined together at connection zone 1184. Each sheet 1160a and 1160b has a non-perforated tear line tear line 1075 of the type described above. The fastener tape 1121 is shipped to the customer with the two sheet 1160a and 1160b separate from one another. This construction allows the customer to easily insert the slider 935 over the fastener strips 922 and 925, and then the customer is able to seal sheets 1160a and 1160b together. Further, in this embodiment, the customer attaches sidewalls 912 and 913 to the inner faces 82 of fastener strips 922 and 925.

Figure 34:
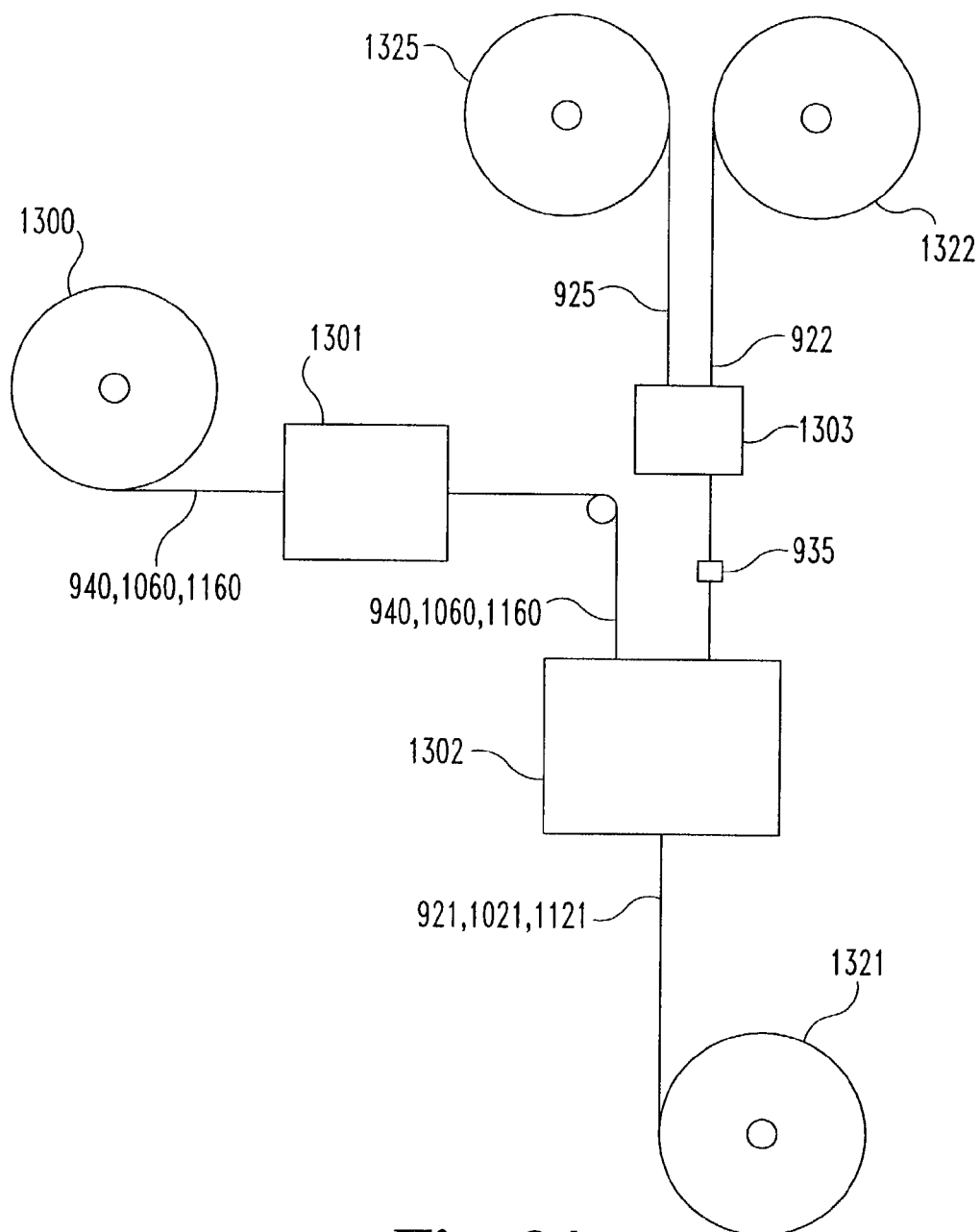
FIG. 34 is a schematic process diagram illustrating techniques for manufacturing fastener tapes according to other embodiments of the present invention.

Techniques for manufacturing the fastener tapes 921, 1021, 1121 illustrated in FIGS. 23-32 will now be described with reference to FIG. 34. One embodiment, fastener strips 922 and 925 are respectively supplied from supply rolls 1322 and 1325. It is contemplated that the fastener strips 922 and 925 can be supplied in other manners. For instance, the fastener strips 922 and 925 can be supplied together on a single roll.

In the technique for manufacturing the fastener tape 921 of FIGS. 23-27, sheet 940 is supplied from roll 1300. However, it should be understood that sheet 940 can be supplied in other fashions. Referring to FIG. 34, the sheet 940 in station 1301 is scored to have a tear line 975 in the pattern illustrated in FIG. 24. Sheet 940 is then folded and attached to the fastener strips 922 and 925 in station 1302 so as to form fastener tape 921. After station 1302, the fastener tape 921 is rolled onto roll 1321 and supplied to the customers for further processing. It should be appreciated that the fastener tape can be shipped to customers in other types of containers.

To manufacture the FIG. 30 fastener tape 1021, sheet or hood 1060 is supplied from roll 1300, but it is contemplated that hood 1060 can be supplied in other manners. Referring to FIG. 34, the tear line pattern 1075 of FIG. 29 is formed on the hood 1060 in station 1301. In some embodiments of the present invention, hood 1060 is attached to both fastener strips 922 and 925 at station 1302, such as by heat or ultrasonics. In other embodiments of the present invention, hood 1060 is attached at station 1302 to only one of the fastener strips. In this alternate embodiment, the assembly of fastener strips and partially attached sheet 1060 is provided to a customer for subsequent attachment to a second sheet of flexible film, the second sheet forming the side walls of the bag. After one or both of the fastener strips 922 and 925 are attached, the fastener tape 1021 can then be shipped to the customer. In yet another embodiment of the present invention, a slider is inserted onto the fastener strips at station 1304. With respect to the FIG. 32 fastener tape 1121, the separate sheets 1160a and 1160b are scored in station 1301, and then the sheets 1160a and 1160b are attached to one another in station 1302 to form hood 1160. Further, in station 1302, the sheets 1160a and 1160b are attached to fastener strips 925 and 922, respectively. It should be appreciated that station 1301 can occur after station 1302 or can be combined with station 1302 such that the scoring and attaching occurs simultaneously.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus, comprising:
   a reclosable adapted and configured for subsequent attachment to the mouth of a bag, said fastener tape including;
   a first fastener strip having a first interlockable profile;
   a second fastener strip having a second interlockable profile constructed and arranged to mate with said first interlockable profile in a reclosable fashion; and
   a sheet connecting said first fastener strip to said second fastener strip, said sheet having a nonlinear tear line, a first portion of said tear line extending across one of said first profile or said second profile, a second portion of said tear line extending generally parallel to the one said profile, said tear line providing a tamper evident seal after said fastener tape is attached to the bag mouth.

2. The apparatus of claim 1, wherein said tear line is unpunctured and said tamper evident seal is hermetic.

3. The apparatus of claim 1, wherein said sheet forms a hood around said first fastener strip and said second fastener strip.

4. The apparatus of claim 3, wherein said hood has a second tear line.

5. The apparatus of claim 3, wherein: said hood is connected to said first fastener strip along a connection region; said hood forms a closed end; and said tear line has a contour for preserving integrity of components of the bag that are fused together at end stops, said contour including a pair of first portions positioned between said mating profiles and said closed end, a second portion positioned between said mating profiles and said connection region, and a pair of transition portions connecting said first portions to said second portion.

6. The apparatus of claim 1, wherein said sheet extends below said first and second fastener strips.

7. The apparatus of claim 1, wherein said tear line has intermittent high and low scored portions for producing a zipping sound when said sheet is torn apart.

8. The apparatus of claim 1, further comprising: wherein said first fastener strip and said second fastener strip are connected together at a plurality of end stops; and a plurality of sliders received over said first fastener strip and said second fastener strip, each said slider being between a pair of end stops for opening and closing said mating profiles.

9. The apparatus of claim 1, wherein: said first fastener strip has an inner face facing said second fastener strip; and said sheet is connected to said first fastener strip at said inner face.

10. The apparatus of claim 1, wherein: said first fastener strip has an outer face facing away from said second fastener strip; and said sheet is connected to said first fastener strip at said outer face.

11. The apparatus of claim 1, wherein said sheet is integrally formed with said first fastener strip and second fastener strip.

12. The apparatus of claim 1 which further comprises a slider for interlocking and unlocking said first strip and said second strip, said slider being slidably engaged to said first fastener strip and said second fastener strip along a path, said first strip and said second strip being joined to one another by an endstop for obstructing the removal of said slider, said tear line extending across a portion of the width of said sheet from a position above said endstop to a position below the pat of said slider.

13. The apparatus of claim 1 wherein said first fastener strip has a first top side, said second fastener strip has a second top side, and said first top side is adjacent said second top side prior to attachment of said fastener tape to the bag mouth, and said sheet connects over said first top side and said second top side after attachment of said fastener tape to the bag mouth.

14. The apparatus of claim 1 which further comprises a plurality of sliders for interlocking and unlocking said first profile and said second profile, said sliders being slidably engaged to said first fastener strip and said second fastener strip.

15. The apparatus of claim 1 wherein said tear line is a first unpunctured tear line and said sheet includes a second unpunctured tear line located proximate to said second fastener strip.

* * * * *

UNITED STATES PATENT AND TRADEMARK OFFICE
CERTIFICATE OF CORRECTION

| | | |
|---|---|---|
| PATENT NO. | : 7,254,873 B2 | Page 1 of 1 |
| APPLICATION NO. | : 10/228236 | |
| DATED | : August 14, 2007 | |
| INVENTOR(S) | : Robert C. Stolmeier et al. | |

It is certified that error appears in the above-identified patent and that said Letters Patent is hereby corrected as shown below:

In column 16, line 3, after "reclosable" please insert --fastener tape--.

Signed and Sealed this

Eighth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,254,873 B2
APPLICATION NO. : 10/228236
DATED : August 14, 2007
INVENTOR(S) : Robert C. Stolmeier et al.

It is certified that error appears in the above-identified patent and that said Letters Patent is hereby corrected as shown below:

In column 16, line 67, please delete "pat" and insert in lieu thereof --path--

Signed and Sealed this

Twenty-first Day of October, 2008

JON W. DUDAS
*Director of the United States Patent and Trademark Office*